(12) United States Patent
Jeffrey et al.

(10) Patent No.: US 8,261,599 B2
(45) Date of Patent: Sep. 11, 2012

(54) METHOD AND SYSTEM FOR DETERMINING AN IMBALANCE OF A WIND TURBINE ROTOR

(75) Inventors: Mike Jeffrey, Ontario (CA); Michael Melsheimer, Berlin (DE); Jan Liersch, Berlin (DE)

(73) Assignee: RBT, LP (CA)

( * ) Notice: Subject to any disclaimer, the term of this patent is extended or adjusted under 35 U.S.C. 154(b) by 722 days.

(21) Appl. No.: 12/427,126

(22) Filed: Apr. 21, 2009

(65) Prior Publication Data

US 2009/0266160 A1 Oct. 29, 2009

Related U.S. Application Data

(60) Provisional application No. 61/047,646, filed on Apr. 24, 2008.

(51) Int. Cl.
*G01M 1/00* (2006.01)
*F04D 27/02* (2006.01)

(52) U.S. Cl. ............................................. 73/66; 415/1
(58) Field of Classification Search ............ 73/700–756
See application file for complete search history.

(56) References Cited

U.S. PATENT DOCUMENTS

| | | | |
|---|---|---|---|
| 2,913,700 A | 11/1959 | Brody | |
| 4,372,157 A | 2/1983 | Caruthers et al. | |
| 4,465,367 A | 8/1984 | Sabatier | |
| 4,513,619 A | 4/1985 | Widdall | |
| 4,583,862 A | 4/1986 | Ferrar et al. | |
| 4,976,147 A | 12/1990 | Okochi et al. | |
| 5,140,856 A | 8/1992 | Larsen | |
| 5,219,454 A | 6/1993 | Class | |
| 6,619,918 B1 | 9/2003 | Rebsdorf | |
| 6,966,754 B2 * | 11/2005 | Wobben | 416/61 |
| 6,973,396 B1 | 12/2005 | Shah et al. | |
| 7,052,232 B2 | 5/2006 | Wobben | |
| 8,041,540 B2 * | 10/2011 | Kerber et al. | 702/182 |
| 2006/0000269 A1 | 1/2006 | LeMieux et al. | |
| 2007/0159346 A1 | 7/2007 | Wesselink | |
| 2008/0247873 A1 | 10/2008 | Egedal | |
| 2009/0266160 A1 * | 10/2009 | Jeffrey et al. | 73/455 |
| 2010/0103260 A1 * | 4/2010 | Williams | 348/144 |
| 2011/0135442 A1 * | 6/2011 | Kerber et al. | 415/1 |
| 2011/0138937 A1 * | 6/2011 | Fritz | 73/865.8 |
| 2011/0206511 A1 * | 8/2011 | Frydendal | 416/61 |
| 2011/0229300 A1 * | 9/2011 | Kanev et al. | 415/1 |

FOREIGN PATENT DOCUMENTS

| | | |
|---|---|---|
| DE | 10032314 C1 | 12/2001 |
| EP | 1870596 A2 | 12/2007 |
| GB | 2211603 A | 7/1989 |
| GB | 2448940 | 11/2008 |
| WO | 92/09871 | 6/1992 |

\* cited by examiner

*Primary Examiner* — Andre Allen
(74) *Attorney, Agent, or Firm* — Dickinson Wright PLLC

(57) ABSTRACT

The present disclosure provides a method and system of determining aerodynamic imbalances of a wind turbine rotor and optionally correcting such imbalances, as well as a method and system for determining mass imbalances of a wind turbine rotor and optionally correcting such imbalances. The aerodynamic imbalances may be detected and corrected using optical analysis of images of the wind turbine rotor. The mass imbalances may be detected and corrected using vibration analysis of the wind turbine rotor, typically using accelerometers or possibly other vibration sensors.

24 Claims, 8 Drawing Sheets

METHOD AND SYSTEM FOR DETERMINING AN IMBALANCE OF A WIND TURBINE ROTOR

RELATED APPLICATION DATA

The present application claims priority to provisional U.S. patent application Ser. No. 61/047,646, filed Apr. 24, 2008, the entire contents of which are incorporated herein by reference.

TECHNICAL FIELD

The present disclosure relates generally to wind turbines and, more particularly to a method and system for determining an imbalance of a wind turbine rotor.

BACKGROUND

Over time, wind turbines may begin to experience vibrations. Vibrations may be the result of an aerodynamic imbalance caused by misalignment of the blades of the turbine rotor or a mass imbalance in the rotor, inclusive of the hub and blades. The vibrations may also be caused by improper alignment of the rotor at the time of installation, or after a major repair or replacement any of the rotor components. Vibrations may cause accelerated wear of gear boxes, bearings, rotor blades and possibly other components which result in reduced operating efficiency and electrical power production. Depending on the cause and/or magnitude of the vibrations, and the extent of the damage to the wind turbine, repairs may be required. In extreme cases, the wind turbine may collapse if the vibrations become too large. The vibrations may also increase the sound generated by the wind turbine during operation, which may be a cause of noise pollution, particularly when the wind turbine is located in or near a residential neighbourhood.

Thus, it is desirable to have a method of detecting aerodynamic imbalances and/or mass imbalances in a wind turbine rotor.

SUMMARY

The present disclosure provides a method and system for determining aerodynamic imbalances of a wind turbine rotor and optionally correcting such imbalances. The present disclosure also provides a method and system for determining mass imbalances of a wind turbine rotor and optionally correcting such imbalances. The present disclosure also provides a method and system for determining both aerodynamic imbalances and mass imbalances of a wind turbine rotor and optionally correcting one or both of such imbalances. The aerodynamic imbalances may be detected and corrected using optical analysis of images of the wind turbine rotor. The mass imbalances may be detected and corrected using vibration analysis of the wind turbine rotor, typically using accelerometers or possibly other vibration sensors.

In accordance with one embodiment of the present disclosure, there is provided a method for determining an imbalance of a rotor of a wind turbine, the wind turbine comprising a tower and a nacelle mounted to the top of the tower, the tower having a central axis extending through the nacelle, the nacelle having a front end and a rear end, the rotor being rotatably connected to the nacelle typically at the front end for rotating about a rotor axis and having a plurality of rotor blades, the rotation of the rotor about the rotor axis defining a rotor plane, the method comprising: positioning a first vibration sensor towards the central axis of the tower with its sensitive axis of the first vibration sensor substantially parallel to the rotor plane; measuring a first data set of vibration data using the first vibration sensor over a first sampling period; and determining a counterweight for at least one blade in the rotor in accordance with the first data set of vibration data when a mass imbalance in the rotor exists.

In accordance with another embodiment of the present disclosure, there is provided a method for determining an imbalance of a rotor of a wind turbine, the wind turbine comprising a tower and a nacelle mounted to the top of the tower, the tower having a central axis extending through the nacelle, the nacelle having a front end and a rear end, the rotor being rotatably connected to the nacelle typically at the front end for rotating about a rotor axis and having a plurality of rotor blades, the rotation of the rotor about the rotor axis defining a rotor plane, the method comprising: positioning a first vibration sensor towards the central axis of the tower with its sensitive axis of the first vibration sensor substantially parallel to the rotor plane; measuring a first data set of vibration data using the first vibration sensor over a first sampling period; and determining a lateral vibration of the rotor in accordance with the first data set.

In accordance with a further embodiment of the present disclosure, there is provided a method of determining balancing of a rotor of a wind turbine, the wind turbine comprising a tower and a nacelle mounted to the top of the tower, the rotor being rotatably connected to the nacelle for rotating about a rotor axis and having a plurality of equally spaced blades, the method comprising: positioning a camera below the rotor; rotating a first blade into a reference position in which a tip of the blade is directed toward the camera; capturing an image of the first blade in the reference position; rotating a second blade into the reference position; capturing an image of the second blade in the reference position; determining a blade angle of the first blade from the image of the first blade in the reference position, wherein the blade angle is the angle between the rotor plane and a predetermined chord line of the blade designed as a reference point; determining the blade angle of the second blade from the image of the second blade in the reference position; and determining whether the blade angle of the first and second blades are within a predetermined threshold.

In accordance with a further embodiment of the present disclosure, there is provided a method of determining an imbalance of a wind turbine rotor comprising: determining aerodynamic imbalances of the wind turbine rotor, and determining mass imbalances of the wind turbine rotor.

In accordance with a further embodiment of the present disclosure, there is provided a method of determining an imbalance of a wind turbine rotor comprising: performing an optical inspection of the wind turbine rotor to identify aerodynamic imbalances of the wind turbine rotor, at least partially correcting aerodynamic imbalances of the wind turbine rotor which exceed a predetermined threshold, performing a vibration analysis of the wind turbine rotor to identify mass imbalances of the wind turbine rotor, and at least partially correcting mass imbalances of the wind turbine rotor which exceed a predetermined threshold.

Other aspects and features of the present disclosure will be apparent to those ordinarily skilled in the art upon review of the following description of example embodiments in conjunction with the accompanying drawings.

BRIEF DESCRIPTION OF THE DRAWINGS

It will be noted that throughout the drawings similar features are identified by the same reference numerals.

DETAILED DESCRIPTION OF EXAMPLE EMBODIMENTS

Figure 1:
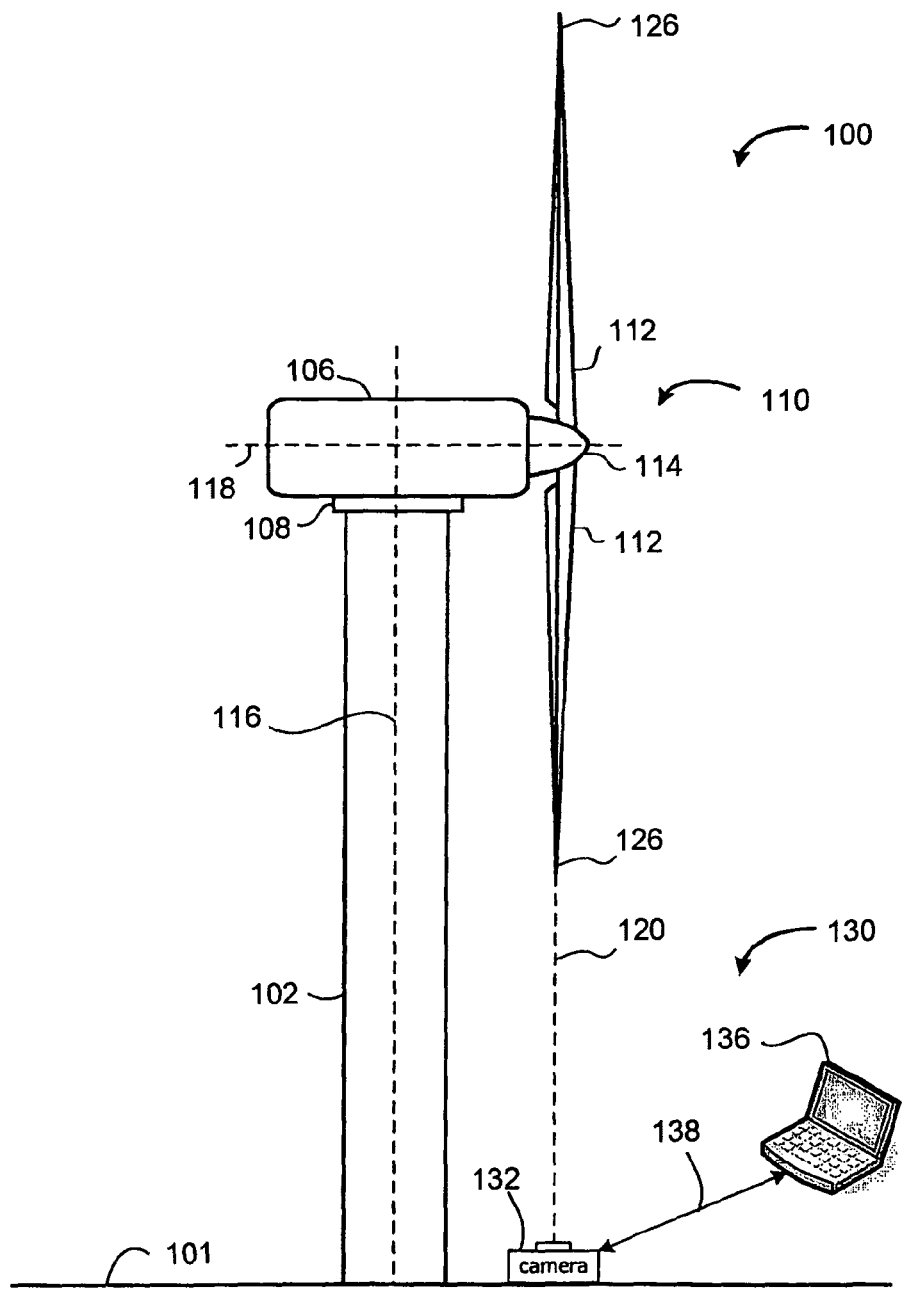
FIG. 1 is a side elevational view of a wind turbine having an optical inspection system in accordance with one embodiment of the present disclosure.
Figure 2:
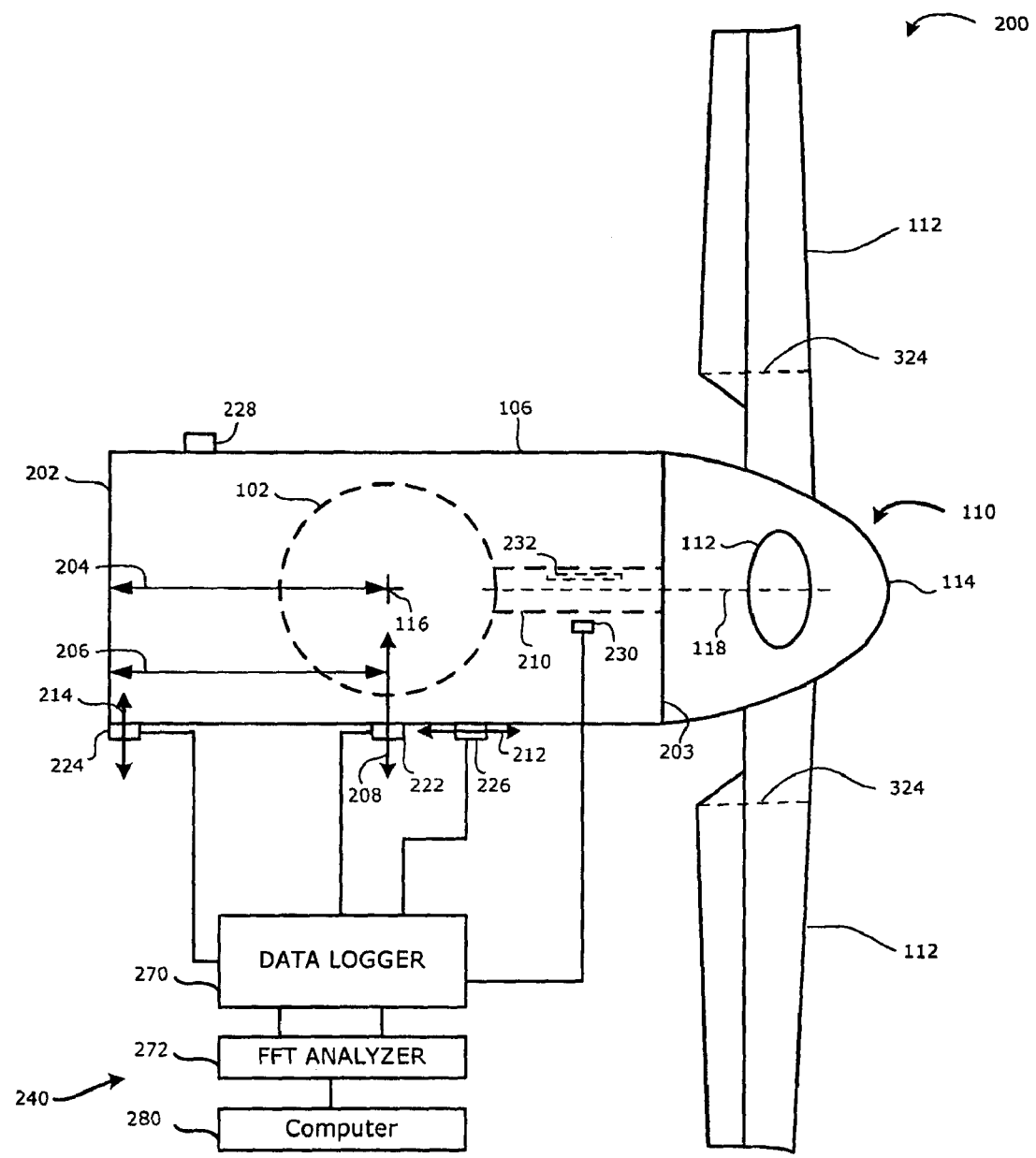
FIG. 2 is a top view of an example measuring system which can be used to measure imbalances of the rotor in the wind turbine of FIG. 1 in accordance with one embodiment of the present disclosure.

Referring to FIGS. 1 and 2, an example of a wind turbine 100 to which example embodiments of the present disclosure can be applied will be described. The wind turbine 100 includes a tower 102 extending from the ground 101 or other supporting surface (e.g., a base), a nacelle 106 mounted on a bedframe 108 of the tower 102, and a rotor 110 coupled to nacelle 106. The rotor 110 includes a hub 114 and a plurality of rotor blades 112 mounted to the hub 114. In the shown embodiment, the rotor 110 includes three rotor blades 112 and is mounted to a rotor shaft 201 (FIG. 2) to provide an axis of rotation 118 (also known as the rotor axis). Typically, the axis of rotation 118 is generally horizontally extending and is usually substantially horizontal. In other embodiments, the rotor 110 may include more or less than three rotor blades 112. Typically, the tower 102 is constructed from tubular steel and defines an internal cavity (not shown) extending between the ground 101 and the nacelle 106. The tower 102 has a central axis 116 extending between the ground 101 and the nacelle 106 and through the cross-section of the tower 102. In other embodiments, other tower constructions such as a lattice tower may be used.

The nacelle 106 is rotatable about the central axis 116 to allow the rotor 110 to be pointed into the wind to allow for optimal power performance. In order to rotate the nacelle 106 about the central axis 116, a cam wheel (not shown) may be mounted onto the tower 102. A yaw motor (not shown) engages the cam wheel to turn the nacelle 106 with the rotor 110 into the wind.

The blades 112 are positioned or "spaced" about the rotor hub 114 at equal intervals about the rotor axis 118 and cause the rotation of the rotor hub 114 and the rotor shaft 210. The rotor 110 is able to rotate freely against the nacelle 106. As the rotor 110 rotates about the rotor axis 118, the nacelle 106 remains substantially stationary relative to the rotor axis 118. As will be appreciated by persons skilled in the art, the wind action against the blades causes the rotor 110 to rotate about the rotor axis 118. When the blades 112 rotate about the rotor axis 118, they define a rotor plane 120 which is typically perpendicular to the rotor axis 118. The nacelle 106 houses generating components (not shown) such as a gearbox and drivetrain which are connected to the rotor shaft 210 (FIG. 2), and a control mechanism (not shown) to control the operation of the wind turbine 100.

The present disclosure provides a system for determining an imbalance of a wind turbine rotor comprising an optical inspection system 130 (FIG. 1) and vibration measurement system 240 (FIG. 2). One embodiment of the optical inspection system 130 will now be described in relation to FIG. 1.

The optical inspection system 130 uses a camera 132 positioned below the rotor 110 to capture images of the turbine blades 112. The camera 132 is positioned at a point along or substantially close to the rotor plane 120 at a distance from the rotor axis 118 that is greater than the length of the rotor blades 112. Typically, the camera 132 is positioned on the ground 101. The camera 132 comprises a lens (not shown) and the camera 132 is oriented such that the lens is directed towards the rotor blades 112. In some embodiments, a tripod (not shown) may be used to hold and position the camera 132.

The camera 132 is typically a digital camera containing a memory (not shown) for storing captured images. The memory may be a removable flash memory card such as, for example, a CompactFlash™ memory card, Secure Digital™ memory card, a Memory Stick™ memory card or xD-Picture Card™ memory card, depending on the type and/or configuration of the digital camera.

It will be recognized that the technical requirements of the camera 132 will vary based on the technical specifications of the wind turbine 100. For example, a higher turbine 100 may require a camera 132 with a greater pixel count and/or a lens with a greater focal length than the camera required for a shorter turbine. It has been found that in many wind turbine inspection environments an 8 mega pixel (MP) camera 132 having a lens with a focal length of 400 mm based on a 24×36 mm equivalent will provide the necessary image clarity.

In the embodiment shown in FIG. 1, the camera 132 is directly connected to a computer 136. The computer 136 may be any suitable computer, and is typically a portable computer such as a notebook, tablet, or laptop computer. Images captured by the camera 132 are transferred (downloaded) to the computer 136 and stored in local memory such as a hard disk drive (HDD) or Random Access Memory (RAM). The computer 136 may be used to display the images captured by the camera 132 on a display device such as a monitor or television external to the computer.

In some embodiments, such as the embodiment shown in FIG. 1, the camera 132 is connected to the computer 136 in the field. That is, the computer 136 is connected to the camera 132 while the camera 132 is situated beneath the rotor 110. In such embodiments, the computer 136 is a portable computer. In other embodiments, the camera 132 is connected to the computer 136 off-site, away from the wind turbine 100. In these embodiments, the computer 136 may be a stationary computer such as a desktop computer.

The camera 132 may be connected to the computer 136 using a data cable 138. The data cable 138 connects at one end to a data port on the camera 132 and at another end to a data port on the computer 136. In some embodiments, the data ports are Universal Serial Bus (USB) data ports. In other embodiments, a memory reader (not shown) may be connected to the computer 136, may be used to connect the camera 132 to the computer 136. The memory reader includes a memory card slot which permits the removable memory of the camera 132 to be inserted therein. To connect the camera 132 to the computer 136, the memory card is removed from the camera 132 and placed in the memory card slot of the memory reader. The computer 136 is then able to access any files stored on the memory card, including the images stored on the memory. In other embodiments, the camera 132 may be connected to the computer 136 wirelessly via a short-range or long-range wireless communication interface. The short-range communication interface may be a personal area network (PAN) interface. A Personal Area Network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as Bluetooth® or IEEE 802.15.3a, also referred to as UltraWideband (UWB), or other PAN connection. The long-range wireless communication interface may be a Wireless Local Area Network (WLAN) which conforms to IEEE 802.11x standards (sometimes referred to as Wi-Fi™) such as, for example, the IEEE 802.11a, 802.11b and/or 802.11g standard. A WLAN includes one or more wireless RF Access Points (AP) connected to an access point (AP) interface. Other communication protocols may be used.

In operation, according to one embodiment, the rotor 110 is rotated about the rotor axis 118 to place one of the rotor blades 112 into a reference position in which the blade tip 126 of the blade 112 is directed towards the camera 132. That is, the rotor 110 is rotated until the blade tip 126 is at a point which is nearest to the camera lens. When the rotor blade 112 is in the reference position, one or a series of image(s) of the first blade tip 126 is captured by the camera 132 and saved to the memory of the camera 132.

Next, the rotor 110 is rotated further until another rotor blade 112 is in the reference position. When the rotor blade 112 is in this position, one or a series of image(s) of the second blade tip 126 is captured by the camera 132 and saved to the memory of the camera 132.

Next, the rotor 110 is rotated further until another rotor blade 112 is in the reference position. When the rotor blade 112 is in this position, one or a series of image(s) of the third blade tip 126 is captured by the camera 132 and saved to the memory of the camera 132.

The process of rotating the rotor blades 112 into the reference position and capturing and saving an image using the camera 132 is repeated for each of the rotor blades 112. For example, at least three images will be taken of a wind turbine 100 which has three blades 112. Multiple images of each blade 112 in the reference position are often taken.

Figure 6:
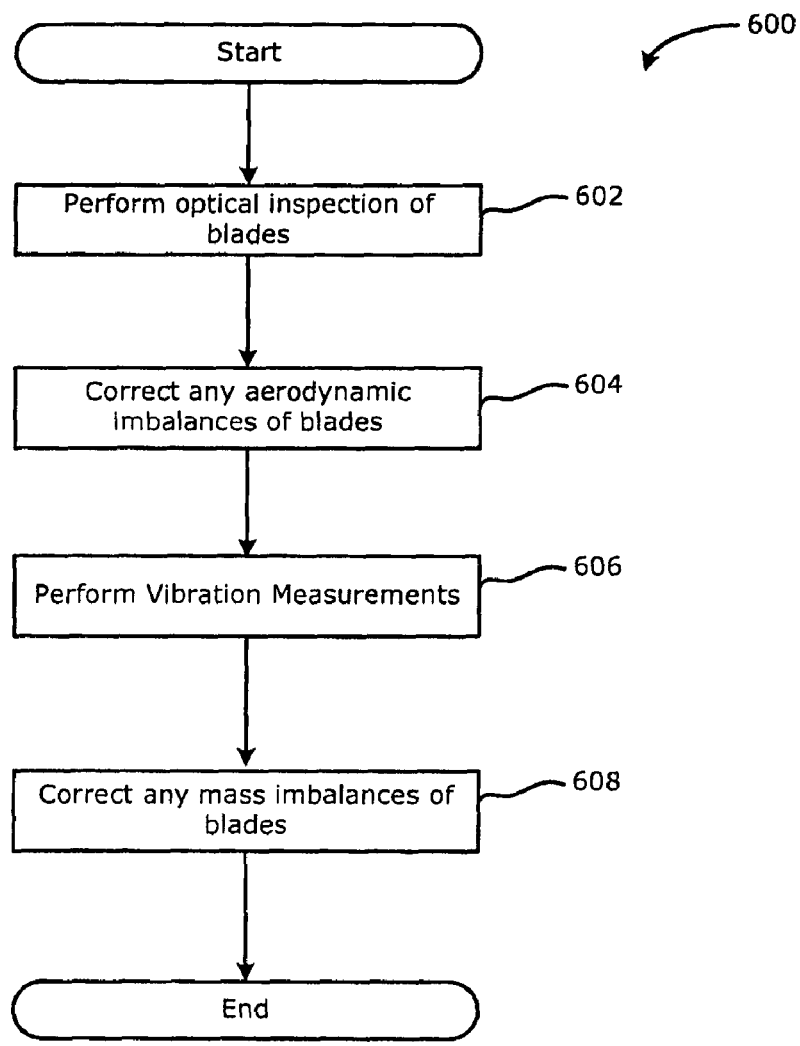
FIG. 6 is a flowchart illustrating example operations for determining imbalances of a wind turbine rotor in accordance with one embodiment of the present disclosure.

Referring now to FIG. 6, example operations 600 for an overall method of determining an imbalance of the rotor of a wind turbine and optionally correcting any imbalance in accordance with one embodiment of the present disclosure will be described. The operations 600 comprise a first step 602 of identifying an aerodynamic imbalance of a rotor 110 of a wind turbine 100 in which an optical inspection is performed.

Next, in step 604 any aerodynamic imbalance of the blades 112 is at least partially corrected by aligning the blades 112 with respect to one another. This step comprises aligning the blades 112 so that the blades 112 have substantially the same blade angle. One embodiment for implementing the steps 602 and 604 is described in more detail below in the operations 400 with reference to FIG. 4. In the operations 400, an optical inspection of the rotor 110 is performed using the optical inspection system 130 to identify an aerodynamic imbalance of the rotor 110 of the wind turbine 100 using the optical inspection system 130. Any aerodynamic imbalance is then corrected.

Next, in step 606 any mass imbalance of the rotor 110 is determined using vibration measurements of the wind turbine 100.

Next, in step 608 the results of the vibration analysis are used to at least partially correct any mass imbalance of the blades 112. This step comprises placing one or more counterweights at appropriate locations on one or more the blades 112 of the rotor 110 of the wind turbine. In at least some embodiments, for a three bladed rotor 110, this comprises adding a counterweight having a mass of u1 at a blade indicate by the phase ($\phi$1) radius at a radius ($r_{rw}$) from the root of the respective blade, and adding a counterweight having a mass of u2 at a blade indicate by the phase ($\phi$2) radius at a radius ($r_{rw}$) from the root of the respective blade.

One embodiment for implementing the steps 606 and 608 is described in more detail below in the operations 500 with reference to FIG. 5. Through the calculations described below, a mass moment is calculated for the rotor blades 112. The blades 112 of most wind turbines have a balancing chamber where counterweights can be added. The calculated mass moment is then typically be divided by the distance of the balancing chamber from the center of rotation, resulting in the mass which must be applied to balance the blades 112. This process calculates the required counterweights to, at least partially correct any mass imbalance of the blades 112.

It will be appreciated by persons skilled in the art that, while the aerodynamic balancing (e.g., optical inspection) of the rotor 110 and the mass balancing (e.g., vibration analysis) are usually performed together in sequence, at other times the aerodynamic balancing of steps 602 and 604, and mass balancing of steps 606 and 608, may be performed independently.

Optical Inspection System

Figure 4:
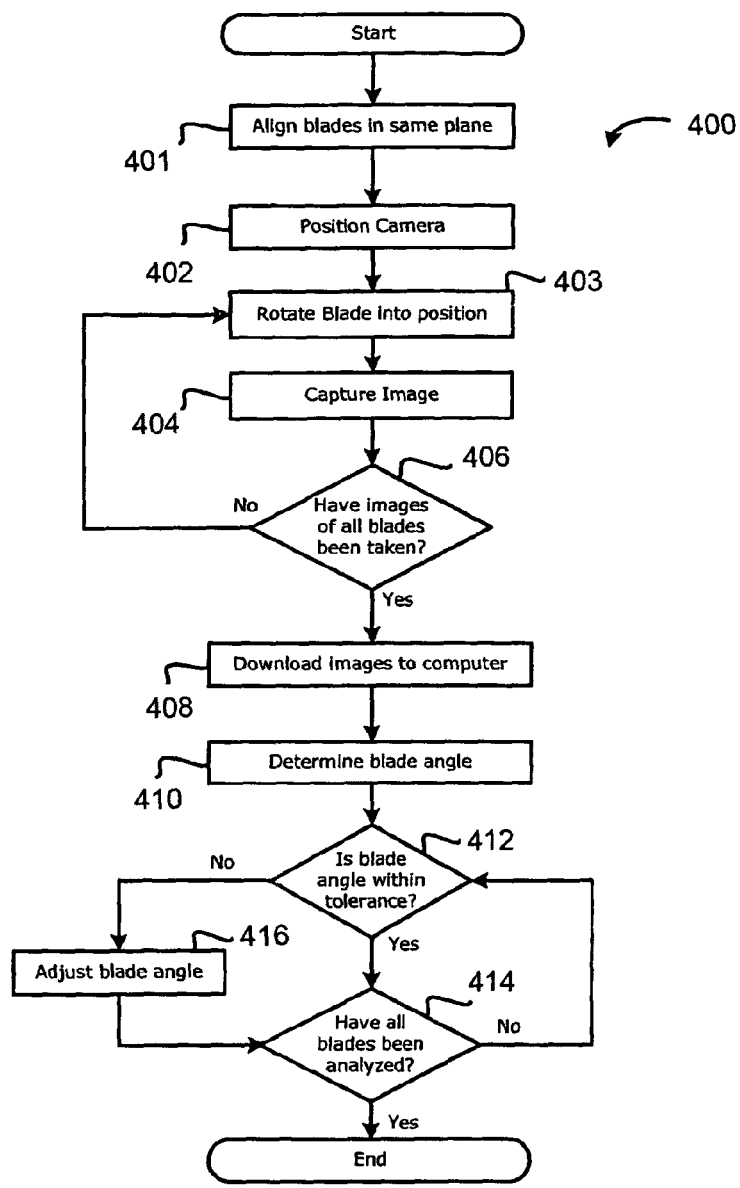
FIG. 4 is a flowchart illustrating example operations for detecting and correcting aerodynamic imbalances of a wind turbine rotor in accordance with one embodiment of the present disclosure.

Referring now to FIG. 4, example operations 400 of a method for identifying an aerodynamic imbalance of a rotor of a wind turbine using the optical inspection system 130 and correcting any aerodynamic imbalance in accordance with one embodiment of the present disclosure will now be described. The operations 400 are performed when the rotor 110 is locked and cannot rotate under wind power (only controlled movement by an operator).

Figure 3:
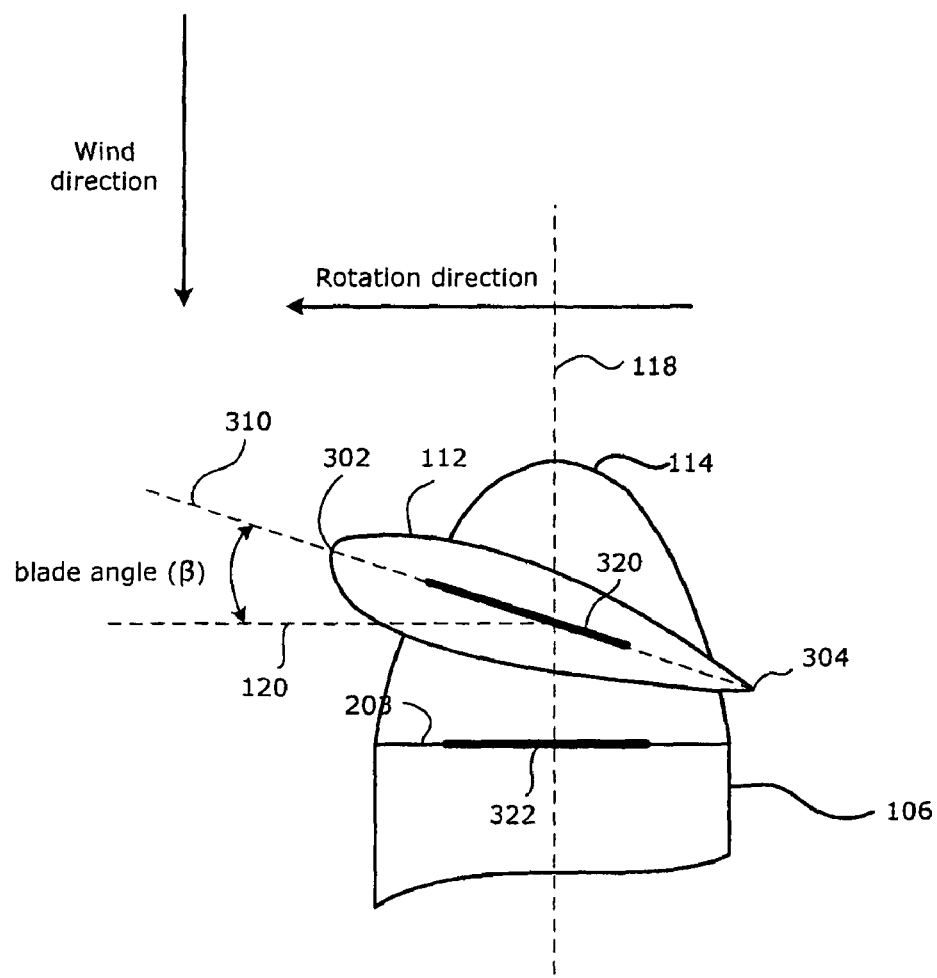
FIG. 3 is a sectional view of a blade of the wind turbine rotor of FIG. 2 illustrating the blade angle (β) of a blade relative to a reference plane.

In the first step 401, the blades 112 of the rotor 110 are roughly aligned so that they are generally in a common plane. This comprises aligning the tips 126 of the blades 112 so that they are generally aligned with each other. Typically this step comprises aligning the tips 126 of the blades 112 with a first reference plane. The first reference plane represents a blade angle of the blades 112 of the rotor 110. As shown in FIG. 3, the blade angle ($\beta$) is the angle between a predetermined chord line 310 of the blade 112 designed as a reference point and the rotor plane 120 (the plane in which the rotor spins). The chord line 310 is the line within the blade cross-section at a given point along its length which joins the leading edge 302 to the trailing edge 304. Typically, the chord line 310 changes along the length of the blade 112. Due to the twist of the blade 112, the chord line 310 at various points along the length of the blade 112 may not be in the same plane and may be located at an angle with respect to each other. The maximum chord line (max chord 324) (FIG. 2) is defined as the chord line at widest point of a blade 112 and is typically angularly offset from the chord line 310 at the tip 126 of the blade 112 due to blade twist. The location of the max chord 324 depends on the blade design.

Typically, the first reference plane is defined by the blade angle when the blades are in a working position. The working position is the blade position (blade angle) when the rotor is in its working position, that is, during normal use when it is rotating under wind power. As described below, the working angle may vary from 0° to 30°. The blade angle when in the blades 112 are in the working position is sometimes referred to as the working angle. The working position may be defined by a specific working angle or, more commonly, a range of working angles. Where the first reference plane represents a working angle of the blade 112, it may represent a typical working angle or an optimal working angle. A blade angle of 0° is often used as the basis for the first reference plane when the aligning the blade in the working position; however, a blade angle between 0 to 30° may be used if desired.

Under normal operating conditions, the working angle (blade angle) is typically 0° (zero degrees); however the optimal working angle may be greater than 0° for some turbines. The working angle may be specified by the manufacturer of the rotor 110 and/or the manufacturer of the blades 112 and varies between rotors. The rotor 110 is typically manufactured and supplied as a single unit during the installation of the turbine 100; however, replacement blades 112 may be supplied over the service life of the turbine 100. The optimal working angle of a rotor 110 in the field may different than the working angle specified by the manufacturer based on design specifications.

For a blade angle of 0°, the chord line 310 is substantially parallel to the rotor plane 120 and a reference line (e.g., the second datum line 322) on the nacelle 106. It will be appreciated by persons skilled in the art; however, that during operation of the wind turbine 100, i.e. when the rotor 110 is rotating under wind power, the working angle may be varied from 0° when wind is blowing at excessively high speeds if the wind turbine 100 has an automated pitch control system. This will reduce the rate of rotation of the rotor 110 and maintain the power output of the wind turbine 100, but will reduce the likelihood of the wind turbine 100 being damaged due to the high speeds. In such cases, the working angle may be varied from between 0° to 30° depending on the type of the wind turbine 100.

Rather than the working position, the first reference plane may represent the blade angle of the blades 112 when in the parked position. In the parked position, the blade angle is typically 90° (ninety degrees). For a blade angle of 90°, the chord line 310 is substantially perpendicular to the rotor plane 120. It is also possible that the first reference plane may be based on a different blade angle.

While analysis and alignment of the blades 112 may be based on any blade angle, if the pitch control mechanism of the turbine 100 is not sufficiently precise or is otherwise defective, blades 112 which are aligned outside of the working angle range (for example, when the blades 112 are in the parked position) may not be aligned when the blades 112 are rotated to the working position for operational use. Thus, analysis of the blade angle and alignment of the blades 112 is preferably based on a blade angle within the working angle range (i.e. at a typical working angle or an optimal working angle), particularly if there are concerns about the accuracy of the pitch control mechanism of the wind turbine 100. However, the analysis of the blade angle and alignment of the blades 112 may be based on any blade angle. If desired, the analysis may be performed twice at two different blade angles as a double check (for example, within the working position and then the parked position, or vice versa). It will be appreciated that, performing the analysis in more than one position requires the blade angle to be changed, and the steps 403 to 414 to be repeated.

Next, in step 402, the camera 132 is placed below the rotor 110 at a point along or substantially close to the rotor plane 120 at a distance from the rotor axis 118 that is greater than the length of the rotor blades 112. The camera is oriented so that its lens points toward the hub 114 of the wind turbine 100. This step could also occur prior to step 401 in other embodiments.

Next, in step 403 one of the rotor blades 112 is rotated into a reference position in which the tip 126 of the rotor blade 112 is pointed towards the camera 132 (i.e., substantially downwards). Next, in step 404 an image of the rotor blade 112 is captured using the camera 132 and saved to the memory of the camera 132. In some embodiments, more than one image of each rotor blade 112 may be obtained using the camera 132 to generate a test series of images. The test series of images may be processed with statistical methods which can be used in calculated values parameter such as a mean blade angle and/or to measure the reliability of the calculated values.

Next, in step 406 a determination is made as to whether at least one image has been obtained for each of the rotor blades 112. If images have not been taken for all of the rotor blades, the operations 400 loop back to step 403 where the steps of rotating a blade 112 into the reference position (step 403), and capturing an image of the blade 112 and saving it to memory are performed is repeated for each of the blades 112. Steps 403 to 406 are repeated until images of all blades 112 have been taken. If images of all blades 112 have been taken, the operations proceed to step 408. As noted above, multiple images of each blade 112 in the reference position are often taken.

Next, in step 408 once an image has been obtained for each rotor blade 112, the images are downloaded to the computer 136. The images may be loaded onto the computer 136 using the data cable 138. The data cable 138 permits the computer 136 to access the memory on the camera 132. In some embodiments, the images may be loaded onto the computer 136 by removing the camera's memory and inserting it into the memory reader. Alternatively, a docking station for the camera 132 may be used. In other embodiments, the camera 132 may connect wirelessly to the computer 136 via a short-range or long-range wireless communication interface.

Next, in step 410 the captured images are analyzed to determine the blade angle ($\beta$) of each blade 112 in the reference position. As noted above, the blade angle is the angle between a predetermined chord line 310 of the blade 112 designed as a reference point and the rotor plane 120 (the plane in which the rotor spins). The predetermined chord line 310 used in determining the blade angle is typically the chord line 310 at the tip 126 of the blade 112, or the max chord 324 of the blade 112. The chord line 310 at the tip 126 of the blade 112 and the max chord 324 each have features which may make them easier to identify in the image in some circumstances: the chord line 310 at the tip 126 of the blade 112 is closer to the camera 132, whereas the max chord 324 is widest the point of the blade and therefore occupies a larger portion of the image. However, it is possible that other blade reference points may be used to identify a chord line in other embodiments in addition to, or instead of, the tip 126 and max chord 324.

The analysis of the images may be performed by an automated system such as an image recognition system, which may be a special purpose computer or a computer program executed on a general purpose computer such as the computer 136 using one or more software modules stored in the memory of the computer. Machine learning/teaching techniques may be used to teach the computer 136 image recognition techniques to analyze the images captured by the camera 132 in accordance with methods described herein. Machine learning techniques are known in the art and will not be described herein.

Using image recognition techniques, the computer 136 may be used to analyze the images captured by the camera 132 and identify (e.g. locate) within each image the chord line at the tip 126 of the blade 112 and/or the max chord 324. Markings on the tip 126 of the blades 122, which are often flat and painted a specific colour, may be used to ease identification of the tip 126 of the blade 112 and the chord line 310 at the tip 126. The chord line 310 typically ends in a thin trailing edge which is relatively easy to identify. The front end 203 of the nacelle 106 where the rotor 110 is attached may be used to ease identification of the rotor plane 120.

Where the chord line 310 at blade tip 126 or the maximum chord line 324 is used, determining the blade angle comprises: determining a maximum chord line 324 of the blade 112 from the image of the blade 112 in the reference position; determining the rotor plane 120 from the image of the blade 112 in the reference position; and determining the blade angle of the blade 112 as the angle between the chord line 310 and the rotor plane 120. In contrast, where the chord line 310 is not at the blade tip 126 or the maximum chord line 324, determining the blade angle of the blade comprises: determining a specific chord line 310 of the blade 112 from the image of the blade 112 in the reference position; determining the rotor plane 120 from the image of the blade 112 in the reference position; and determining the blade angle of the blade 112 as the angle between the chord line 310 and the rotor plane 120.

The use of two reference points (e.g. two chord lines 310) improves the accuracy of aerodynamic balancing/alignment by providing alternative reference points should the blade be damaged, for example due to a lightning strike, and one of the reference points cannot be identified. If the blade twist is the same or substantially the same for all blades 112, the chord line 310 at the tip 126 of the blade 112 is typically used to determine the blade angle since it is closer to the camera 132 and often easier to identify in the image. The use of two references points also provides a double check during aerodynamic alignment of the blades 112. Thus, after the rotor 110 has been analysed and optionally aligned based on a blade angle based on the chord line 310 at the tip 126 of the blade 112, the blade angle based on the max chord 324 may be determined from images of the aligned rotor 110 to ensure that the blade angle is within the predetermined tolerances after blade alignment correction. Conversely, the blade angle based on the chord line 310 at the tip 126 of the blade 112 may be used to check a blade alignment based on the max chord 324 of the blades 112. However, it will be appreciated that only one blade reference is required to analyse and align the blades 112 of the rotor 110, and in other embodiments only one of the chord line 310 at the tip 126 and max chord 324 may be used.

While the foregoing description has made reference to the chord line 310, it will be understood that other blade characteristics which can be vectorized and which represent the blade angle, can also be used by the automated system.

In some embodiments, the images may be read and analyzed in an imaging application which automatically locates and adds a first datum line 320 (reference line) to the images along the chord line 310 of the tip 126 of the blade 112. As noted above, markings on the tip 126 of the blades 112 may assist as a reference in locating the chord line 310. The imaging application may also automatically locate and add a second datum line 322 to the image on or parallel to the rotor plane 120 (in the shown embodiment, the second datum line 322 is positioned parallel to the rotor plane 120 at or near front end 203 of the nacelle 106). The front end 203 of the nacelle 106 may assist as a reference in locating the rotor plane 120. The coordinates of the first and second datum lines (e.g., starting and ending points in an "x, y" coordinate system) are then determined. Using the coordinates and/or linear functions defined by the first and second datum lines, the blade angle is determined as the angle between the first and second datum lines. The above processes may be performed for a number of images of each blade 112 in the reference position, and the mean and/or average value used as a measure of the blade angle of the blade 112. Other statistical measures may also be used, for example, to determine the accuracy of the calculated blade angle. For example, the standard deviation of the calculated blade angle may be used to determine if the differences in the calculated blade angle is within accepted tolerances. If the standard deviation is above a predetermined threshold, the error in the calculations is too high and the blade angle which has been calculated is not reliable. In such instances, the calculations of the blade angle should be repeated.

In some embodiments, the entire process of analyzing the images may be automated so that the technician need only download the images from the camera 132 and optionally instruct the image recognition program to process the images. The image recognition program may optionally automatically process the images upon the images being downloaded to the computer, for example, the image download may be controlled by the image recognition program which will be aware or alerted of new image downloads.

In some embodiments, the imaging application is a digital photo/image editing application such as Paint Shop Pro™, Adobe Photoshop™ or similar image editing application. The image editing application is used to view the images, and the first and second datum lines are added to the images for the chord line 310 and rotor plane 120 by a technician using the identification techniques described above. The coordinates of the first and second datum lines may be determined from the image editing application by the technician (for example, based on pixel values of the start and end points of the first and second datum lines), and input to a spreadsheet of a spreadsheet application such as, for example, Microsoft Excel™ or a similar application. The input of coordinate data from the image editing application to the spreadsheet in the spreadsheet application may be automated, for example by the use of macros, to eliminate or reduce data entry by the technician. As will be appreciated by persons skilled in the art, macros are software rules which instruct the computer how input sequences are to be processed to produce output sequences in accordance with a defined procedure. Within the spreadsheet, built-in macros may be used, in some example embodiments, to obtain the blade angle of each image of each turbine blade, determine the average and/or mean of the blade angle for each image, and standard deviation of the blade angle.

In embodiments where multiple images are captured for each blade 112, the blade angle of each blade 112 may be calculated for each image of a given blade, thereby creating a set of blade angles for the blade 112. A mean blade angle for the blade 112 can then be determined from the set of blade angles.

Next, in step 412 the calculated blade angle of each of the turbine blades 112 is compared to the blade angle of the first reference plane to determine if the blade angle is within a predetermined tolerance threshold. The predetermined tolerance threshold is typically +/−0.5°; however tolerances of +/−0.2 to 0.3 degrees may be used for some turbines. The predetermined tolerance threshold is typically specified by the manufacturer of the rotor 110 and/or the manufacturer of the blades 112 and varies between rotors.

If the blade angle is within the predetermined tolerance threshold, the next blade 112 is analyzed (decision block 414). If the blade angle is not within the predetermined tolerance threshold, the operations 400 proceed to step 416 where the blade angle of the blade 112 is adjusted to position the blade within the predetermined tolerance threshold of the blade angle. An incorrect blade angle may be corrected by adjusting manually or using an automated pitch control system (not shown) depending on the type of turbine. An example of an automated pitch control system is described in U.S. Pat. No. 4,348,155, entitled Wind Turbine Blade Pitch Control System, issued Sep. 7, 1982, which is incorporated herein by reference. As will be appreciated by persons skilled in the art, some turbines have automated pitch control systems whereas others do not. If no pitch control system is provided, the pitch must be adjusted by manually adjusting the blade position.

When all blades 112 in the rotor 110 have been analyzed and adjusted as necessary (decision block 414), the operations 400 end.

In some instances, the optimal working angle for the blades 112 is determined after the blades 112 have been aligned. Typically, the optimal working angle is determined during the first balancing of the turbine 100 but could be performed during each balancing or could be performed periodically at predetermined balancing operations. Typically, pitch control systems are configured to adjust the blade angle (also known as the blade pitch) in accordance with the determined wind speed (wind speed can be measured using any kind of wind speed sensor, many of which are known in the art). However, the pitch control systems are often not configured to adjust the blade angle in accordance with the determined wind speed to achieve the optimal working angle for power output at a given wind speed. Instead, pitch control systems are configured to adjust the blade angle in accordance with the determined wind speed based on a table of default values or equations which relate wind speed to blade angle based on design specifications. However, once installed in the field, the optimal blade angle (working angle) for power output may differ from the theoretical design values maintained by the controller of the pitch control system.

After aligning the blades of the turbine blade 112, an optimal working angle for prevailing wind speed may be calculated based on images of the blades 112. An iterative process may be used in which a candidate optimal working angle is determined and the blades 112 are adjusted to the candidate optimal working angle. If the working angle is still not optimal, a further candidate optimal working angle is determined and the blades 112 are adjusted to the further candidate optimal working angle. This process is repeated until the optimal working angle of the blades 112 is determined. Once the optimal working angle is determined, the settings for the controller of the pitch control system are adjusted to indicate the optimal working angle as the blade angle for the prevailing wind speed. Typically, settings for other wind speeds can be automatically determined based on an adjusted table of values (which may automatically adjust based on built-in macros or other equations) or equations which relate wind speed to blade angle. Alternatively, the optimal working angle could be determined at a number of reference wind speeds required by the controller of the pitch control system.

Alternatively, in other embodiments step 401 may be omitted and, rather than aligning each of the blades 112 to first reference plane, one of the blades 112 may used as a reference blade 112. The reference blade may be, for example, the first measured/imaged blade 112. The blade angle of the reference blade 112 is compared against the blade angle of the other turbine blades 112 to determine if the blade angles of the blades 112 are within the predetermined tolerance threshold.

If the difference between the blade angle of a blade 112 and the reference blade 112 is greater than or equal to the predetermined tolerance threshold, the blade angle is out of tolerance and the blade angle of the blade 112 is adjusted to correct the blade angle. If the difference between the blade angle of a blade 112 and the reference blade 112 is less than the predetermined tolerance threshold, the blade angle is within tolerance and the next blade 112 is analysed until all blades 112 in the rotor 110 have been analyzed and adjusted (if necessary).

While the operations 400 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The images for the rotor blades 112 may also be analyzed for other blade defects or faults such as twist failures, cone angle errors, division angle errors, leading edge erosion, and missing vortex generators and/or stall strips. If such defects are detected on a rotor blade 112, the blade 112 may require repair or replacement depending on the severity. Repair or replacement of such defects may require the rotor blade 112 to be removed unlike adjustments to the angle which may be performed in-situ.

In other embodiments, operations for determining an aerodynamic imbalance in which misalignment of the blades 112 is determined may be performed using laser measurement techniques using a laser positioned on the ground 101 rather than using the camera 132. Laser measurement techniques for determining misalignment of the blades 112 are known in the art and will not be described herein.

Vibration Measurement System

Referring now to FIG. 2, a vibration measurement system 240 in accordance with one embodiment of the present disclosure will be described. The vibration measurement system 240 comprises accelerometers 222, 224, 226 and a rotation speed sensor 230 connected to a data logger 270, and a Fast Fourier Transformation (FFT) analyzer 272 which is connected to the data logger 270. The FFT analyzer 272 is connected to a computer 280 via a respective input data port. The computer 280 may be used to analyze vibration measurement data input from the FFT analyzer 272. The computer 280 may be the computer 136 described above.

The computer 280 may be any suitable computer, and is typically a portable computer such as a notebook, tablet, or laptop computer. The computer 280 typically comprises a controller having at least processor (i.e., microprocessor) for controlling its operation, a display screen or monitor connected to the processor, one or more user input devices such as a keyboard and mouse connected to the processor for sending user input signals to the processor in response to user inputs, a memory or storage element s connected to the processor such as a hard disk drive (HDD), RAM, ROM and/or other suitable memory connected to the processor, and other suitable input and output devices (not shown) as desired or required. The memory has data and instructions stored thereon for configuring the processor 280 for analyzing vibration measurement data as described below. Operating system software, software applications, and data used by the processor are stored in the memory. The software and data configure the operation of the computer 280. Other features of the computer for implementing the processes and functions described herein will be appreciated by persons ordinarily skilled in the art.

As shown in FIG. 2, the vibration measurement system 240 includes a first accelerometer 222 positioned at a distance 206 from the end of the nacelle 106 towards the center and central axis 116 of the tower 102. The first accelerometer 222 is typically positioned on the metal frame of the tower 102 at or near the central axis 116 of the tower 102. Typically, the first accelerometer 222 is positioned at a distance of 0.2 m or less from the central axis 116 of the tower 102. In other words, the first accelerometer 222 is positioned at a distance 206 from a rear end 202 of the nacelle 106 that is approximately the same as the distance 204 between the rear end 202 of the nacelle 106 and the central axis 116 of the tower 102. When the first accelerometer 222 is in this position, any torsional effects due to the tendency of the nacelle 106 to rotate about the central axis 116 during rotation of the rotor 110 are reduced or minimized in the measurements taken by the first accelerometer 222. It will be understood that in some situations it will be difficult to position the first accelerometer 222 in the location described above. In such situations, the first accelerometer 222 is positioned to be as close as practically possible to the central axis 116. This position, advantageously, reduces or eliminates the effects of axial and torsional vibration of the rotor 110 on the first accelerometer 222, and therefore reduces or eliminates the axial and torsional vibration from the readings of the first accelerometer 222.

The first accelerometer 222 is orientated so that a sensitive axis 208 of the accelerometer 222 is generally parallel to the rotor plane 120. When the first accelerometer 222 is oriented in this manner, the accelerometer 222 measures the vibrations in a direction that is parallel to the rotor plane 120. When the first accelerometer 222 is oriented in this manner it may be referred to as a lateral accelerometer 222, and sometimes as the first lateral accelerometer or lateral central accelerometer. By eliminating the torsional effects on the lateral accelerometer 222, the vibrations measured by the lateral accelerometer 222 are largely related to mass imbalances of the rotor 110.

A second accelerometer 224 may be positioned on the wind turbine for measuring torsional vibration of the wind turbine 100. The second accelerometer 224 is typically positioned on the metal frame of the tower 102 offset from the first accelerometer 222. The second accelerometer 224 is typically positioned at or near the rear end 202 of the nacelle 106. The second accelerometer 224 is positioned as close as practically possible to the rear end 202 of the nacelle 106. In other embodiments, the second accelerometer 224 may be positioned near the front end of the nacelle 106. For a typical wind turbine, the second accelerometer 224 (located towards the end of the tower frame) is located at a distance of approximately 4 m from the first accelerometer 222 (located towards the center of the tower). However, the exact location depends on the size and type of the wind turbine 100.

The second accelerometer 224 is positioned so that a sensitive axis 214 of the second accelerometer 224 is parallel to the sensitive axis 208 of the first accelerometer 222. That is, the second accelerometer 224 is typically positioned so that its sensitive axis 214 is orientated in the lateral direction. When the second accelerometer 222 is oriented in this manner it is sometimes referred to as the second lateral accelerometer or lateral peripheral accelerometer. The torsional vibration of the wind turbine 100 may be determined as the difference between the second accelerometer 224 and the first accelerometer 222 measurements. To calculate the difference between the first accelerometer 222 and the second accelerometer 224, the vibration measurements from each accelerometer 222 and 224 may be recorded using a data logger 270. The data may then be evaluated using a data analysis and evaluation tool such as the FAMOS™ software tool from IMC Meβsysteme GmbH ("IMC") of Germany; however a hardware implementation or other suitable software running on a computer or other device could be used to calculate the difference between the measurements from the first accelerometer 222 and the second accelerometer 224. The torsional vibration of the wind turbine 100 is mostly related to aerodynamic defects. However, mass imbalance is also a significant cause of the torsional vibration and movement of the wind turbine 100.

A third accelerometer 226 may be positioned on the metal frame of the tower 102 inside the housing of the nacelle 106 so that a sensitive axis 212 of the third accelerometer 226 is parallel to the rotor axis 118. When the third accelerometer 226 is oriented in this manner, the third accelerometer 226 may be referred to as an axial accelerometer 226. The axial accelerometer 226 measures the axial vibration of the wind turbine 100 when the wind turbine 100 is in operation. The axial vibration of the wind turbine 100 is mostly related to aerodynamic defects in the wind turbine 100 as distinguished from mass imbalance defects in the rotor 110 of the wind turbine 100.

Figure 8:
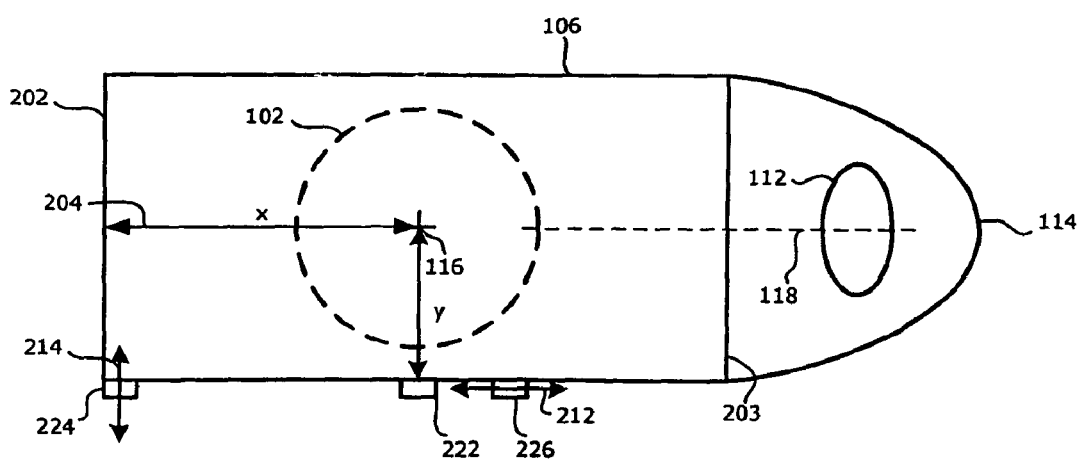
FIG. 8 a top view of the measuring system of FIG. 2 showing the position of accelerometers relative to components of the rotor of the wind turbine of FIG. 1 in accordance with one embodiment of the present disclosure.

Referring briefly to FIG. 8, the positions of the accelerometers 222, 224, 226 of the vibration measurement system 240 in accordance with one example embodiment of the present disclosure will be described. The position of the accelerometers 222, 224, 226 are defined by an x, y coordinate system with an origin at the central axis 116 of the tower 102 with the y-axis parallel to the rotor plane 120 (and the x-axis perpendicular to the rotor plane 120). The position of the accelerometers 222, 224, 226 in one example embodiment are:

| Sensor | x (m) | y (m) |
| --- | --- | --- |
| Lateral center accelerometer 222 | 0.16 | 1.28 |
| Lateral peripheral accelerometer 224 | 4.67 | 0.78 |
| Axial accelerometer 226 | −0.46 | 0.98 |

Other positions are also possible in different turbines. In general, the accelerometers 222, 224, 226 should be placed as close as possible to reference points described above.

As will be appreciated by persons skilled in the art, an accelerometer is a sensor which converts acceleration from motion (e.g. tilt, inertial, or vibration) or gravity into an electrical signal (producing a corresponding change in output) and is available in one, two or three axis configurations. Accelerometers may produce digital or analog output data signals. Generally, two types of outputs are available depending on whether an analog or digital accelerometer is used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface.

The output of an accelerometer is typically measured in terms of the gravitational acceleration constant at the Earth's surface, denoted g, which is approximately 9.81 m/s² (32.2 ft/s²) as the standard average. The accelerometer may be of almost any type including, but not limited to, a capacitive, piezoelectric, piezoresistive, or gas-based accelerometer. The range of accelerometers vary up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland. In some example embodiments, a model 3701G3FA3G accelerometer from PCB Piezotronics, Inc. may be used.

The accelerometers 222, 224, 226 are typically single-axis linear digital accelerometers. However, in some embodiments a multi-axis accelerometer which measures acceleration in at least two orthogonal directions (e.g., "x" and "y" directions) may be used, for example, instead of the first lateral accelerometer 222 and the axial accelerometer 226. Typically, the accelerometers have a sensitivity of at least 0.1 mg to 1 g, and a frequency range between 0.01 to 10 Hz. The typical measurement range for the accelerometers 222, 224, 226 will be between 0 and 100 mg.

A rotation speed sensor 230 may also be used to measure the rotation speed of the rotor 110 and/or the rotor shaft 210. The sensor 230 may be placed within the nacelle 106 and directed at the rotor shaft 210. In one embodiment, the sensor 230 is an optical sensor. In this embodiment, a reflector 232 may be placed on the rotor shaft 210. The reflector 232 may be reflective tape. As the rotor shaft 210 rotates about the rotor axis 118, the reflective tape will periodically pass in front of the optical sensor 230. When the optical sensor 230 detects the presence of the reflector 232, the optical sensor 230 outputs a data signal representation of rotation speed of the rotor 110. Typically, the sensor 230 outputs a digital signal. The rotation speed sensor 230 may be a photoelectric tachometer probe.

It will be appreciated by one skilled in the art that various other sensor configurations may be used to determine the rotation speed of the rotor shaft 210 and/or rotor 110. For example, the sensor 230 may be a proximity sensor. In other embodiments, a reflector may be placed on one of the rotor blades 112 and an optical sensor may be mounted on the tower 102 and directed at the rotor blades 112.

The accelerometers 222, 224, 226 and rotation speed sensor 230 are each connected to a data logger 270. The data logger 270 records vibration data output from the accelerometers 222, 224, 226 and the rotation speed sensor 230. The data logger 270 typically has a minimum sampling rate of 1 kHz and one channel for each of the accelerometers 222, 224, 226 and one channel for a rotation speed of the rotation speed sensor 230. For example, in embodiments in which there are three accelerometers, the data logger 270 has at least four channels: 3 channels for acceleration signals from each of the three accelerometers, and 1 channel for rotation speed signal from the rotation speed sensor 230

The data logger 270 is connected to the Fast Fourier Transformation (FFT) analyzer 272. FFT analyzers are known in the art and will not be described in detail herein. A number of suitable data loggers are sold by IMC. An example of a suitable FFT analyzer is IMC's FAMOS™ tool; however a hardware implementation or other suitable software running on a computer or other device could be used. In some embodiments, the data logger 270 and the FFT analyzer may be implemented on a single device. For example, a WindGuard™ Balancing Box sold by Deutsche WindGuard Dynamics GmbH may be used to perform the FFT analysis.

The FFT analyzer 272 determines the average amplitude and phase of vibration measured by the accelerometers over a sampling period (sample duration). In at least some embodiments, the FFT analyzer 272 has four channels and receives inputs from the accelerometers 222, 224, 226 and the rotation speed sensor 230. The FFT analyzer 272 assists in allowing the vibrations of the rotor 110 to be quantified.

The rotation speed sensor 230 allows the FFT analyzer 272 to perform an ordered FFT analysis on the vibration measurements from the accelerometers 222, 224, 226. The ordered FFT analysis normalizes the measurement to the rotation speed during the measurements so that the frequency of the measured vibration is expressed as multipliers of the rotational frequency. The ordered FFT analysis takes into account the rotation speed of the rotor 110 so that the vibration data may be compared in terms of a constant rotation speed. If a constant rotation speed of the rotor 110 may be maintained, an ordered FFT analysis is not required and a regular non-ordered FFT analysis may be performed. However, since the wind speed is subject to change, and changes in the wind speed result in changes in the rotation speed of the rotor 110, a constant rotation speed of the rotor 110 can rarely be ensured. It will be appreciated that the readings of each of the accelerometers 222, 224, 226 over time forms a time series. If the rotation speed sensor 230 outputs a single pulse (measurement signal) per revolution, the time series may be normalized between each two measurement signals of the rotation speed sensor 230. Normalizing the sample data adjusts the measurements of each revolution (cycle) so that they appear to have been taken over the duration of one revolution of the rotor 110 at constant rotation speed. Normalized data results in more defined sample spikes from the accelerometer readings, and facilitates the FFT analyzer 272 determining the average amplitude and phase of vibration measured by the accelerometers over the sampling period. It will be appreciated by persons skilled in the art that the average amplitude and phase of the vibration measured depend on the average rotation speed of the rotor 110. In order to ensure that the vibration data of each data set may be compared, the average value of the rotation speed during the measurement of each data set of vibration data must be substantially equal. The preferred average value of the rotation speed is the reference rotation speed described below.

The ordered FFT analysis normalizes the measurement to the average rotation speed during the measurements so that the frequency of the measured vibration during each rotation is based on a constant rotation speed rather than the actual rotation speed. If the actual rotation speed for a given rotation of the rotor 110 is less than the average rotation speed, the time parameter of the vibration measurements is expanded to match that of the average rotation speed so that the samples appear to have taken place over the duration of a revolution of the rotor 110 at average rotation speed. Conversely, if the actual rotation speed for a given rotation of the turbine is more than the average rotation speed, the time parameter of the vibration measurements is compressed to match that of the average rotation speed so that the samples appear to have taken place over the duration of a revolution of the rotor 110 at average rotation speed. This occurs by adjusting the time axis by re-sampling the measurement data using linear approximation to obtain a constant number of samples per revolution and which comprises the same number of samples as a revolution at the average rotation speed. Thus, the re-sampled first and second data sets will be the same size. As the amount of variation in the wind speed increases, error in the ordered FFT analysis increases. If the variation of the rotation speed is more than 5 to 10%, the error may be too high for many applications in which case the analysis should be performed at another time when the variation in the wind speed is more constant.

The reference rotation speed is the ideal or preferred operating speed which is 60 to 90% of the natural frequency of the tower 102 of the wind turbine 100, typically 85% of the natural frequency of the tower 102. As will be appreciated by persons skilled in the art, the natural frequency varies between wind turbines. The natural frequency is determined using the accelerometers 222, 224, 226 by operating the wind turbine 100 at full speed, performing an emergency stop, and taking measurements using one or more of the accelerometers 222, 224, 226. In some cases, the readings of only the axial accelerometer 226 are used because vibration resulting from an emergency stop are primarily in the axial direction and less so in the lateral and torsional directions. Employing the emergency stop creates an immediate loss of thrust that leads to a vibration with high amplitude that can be measured. The reference rotation speed is calculated as the measured natural frequency multiplied by the safety margin (where f is the measured natural frequency). Thus, if a reference rotation speed of 85% of the natural frequency is to be used, the reference rotation speed is equal to f*0.85*60 s/min (RPM). The reference rotation speed is usually at a low shaft speed (rotation) and is commonly in the range of 10 to 30 rotations per minute (RPM) for many turbines; however the exact reference rotation speed varies and depends primarily on the type of wind turbine.

In other embodiments, a specialized torsional sensor 228 may be used to determine the torsional vibration of the wind turbine 100. The torsional sensor 228 may be positioned anywhere on the tower 102 and would be connected to the data logger 270 and FFT analyzer 272. The torsional sensor 228 may be used instead of the second lateral accelerometer or lateral peripheral accelerometer. The specialized torsional sensor 228 may be a model TD70 torsional sensor from ME-Meβsysteme GmbH of Hennigsdorf, Germany. However, a torsional sensor 228 with improved sensitivity would increase accuracy of results.

In other embodiments, the rotation speed sensor 230 may not be connected to the FFT analyzer 272, in which case the FFT analyzer 272 performs a non-order FFT analysis. The output of the FFT analyzer 272 may then be normalized using the measurement signals from rotation speed sensor 230 using a separate analyzer, which could be in hardware or software. In alternate embodiments, it is possible that no rotation speed sensor 230 is used in which case no rotation speed sensor data is sent to the data logger 270 or FFT analyzer 272.

The lateral movement of the wind turbine 100 is largely related to a mass imbalance in the wind turbine 100, and therefore a mass imbalance may be detected using the lateral vibration data output from the FFT analyzer 270 which originated from the lateral accelerometer 222. A mass imbalance may be corrected by counterbalancing the rotor 110 with counterweights.

Counterweight Calculations

A method of determining the amount and location of the counterweights required to balance a mass imbalance of a rotor 110 in accordance with one embodiment of the present disclosure will now be described. As will be appreciated by persons skilled in the art, accelerometers typically output a digital representation of the measured vibration either directly if the accelerometer is a digital accelerometer, or using an analog-to-digital converter (ADC) connected to an analog accelerometer. This output, typically in terms of the bit scale of the accelerometer or ADC, can be calibrated in terms of the +/−"g" scale of the accelerometer used during the measurement period. The FFT analyzer 272 uses the rotation of the rotor 110 obtained from the rotation speed sensor 230 to determine an average amplitude (e.g. "g") and an average phase (also referred to as the angle or offset) of the vibration measured by the lateral accelerometer 222 over the measurement period. The phase is relative to a coordinate system which has its origin at the center of the rotation (i.e., a centre of the rotor 110). The phase is also relative to the rotation of the rotor 110 and one reference blade 112 from which the rotations of the rotor 110 are measured. The position where the reflector 232 (e.g. reflective tape) passes the rotation speed sensor 230 represents a phase of 0°. The path of the reference blade 112 during a rotation of the rotor 110 from the point where the reflector 232 first passes the rotation speed sensor 230 to where the reflector passes the rotation speed sensor 230 upon completion of a full rotation cycle represents a phase range of 0° to 360°.

The lateral vibration measured by the lateral accelerometer 222 during testing and output by the FFT analyzer 272 provides a first vector ($\overline{U}_1$) (also referred to as the imbalance vector) which has an average amplitude corresponding to the average vibration in the lateral direction of the rotor 110 and an average phase relative to the coordinate system which has its origin at the center of the rotation (i.e., the centre of the rotor 110). In a 3-bladed turbine, each of the blades 112 is separated by a 120 degree distance in the rotor plane 120.

The measurements of the accelerometer 222 may be calibrated with one or more test weights (also referred to as the test mass) having a predetermined mass (denoted $m_{tw}$) on one of the blades 112 positioned at a predetermined radius (denoted $r_{tw}$) from the center of rotation of the rotor 110 and blade 112. The blade 112 having the test weights can be chosen randomly and is also referred to as the reference blade 112. The reference blade 112 may be the blade 112 with the reflector 232, but this is not required. The amount and location of the test weights depends on the turbine size and the distance which can be reached without any difficulties from the nacelle 106. Typically, a test weight of approximately 100 kg is located towards the blade root of the reference blade at approximately 2 m from the center of rotation of rotor 110. This results in a test weight imbalance of 200 kg·m (100 kg×2 m). Test weights are typically strapped to the outside of the blade root of the reference blade 112 where there is relatively no aerodynamic effect. For larger blades, test weights may be placed temporarily inside the blade 112, for example, in a balancing chamber. Similar to the normalized (ordered) FFT analysis described above, the sample data with and without the test weights may be normalized for each single revolution so that it appears to have taken place over the same duration. Thus, the frequency of the amplitude and phase of the vibration measured is expressed as multipliers of the rotational frequency. This may occur by adjusting the time axis by re-sampling the measurement data using linear approximation to obtain a constant number of samples per revolution, and which optionally comprises the same number of samples per revolution for all data sets measured.

The presence of the test weights change the amplitude and phase of the vibrations of the rotor 110 compared with the measurements taken without the test weights. When sample measurements are taken without the test weights, the FFT analyzer 272 outputs and provides a first vector known as the imbalance vector (denoted $\overline{U}_1$). $\overline{U}_1$ represents the mass imbalance of the rotor 110. When the test weights are added to the reference blade 112 and sample measurements are taken, the FFT analyzer 272 outputs and provides a second imbalance vector (denoted $\overline{U}_2$) with a different average amplitude and phase than $\overline{U}_1$. $\overline{U}_2$ represents both the mass imbalance of the rotor 110 represented by $\overline{U}_1$, and the mass influence due to the test weights (denoted $\overline{U}_d$). The third imbalance vector $\overline{U}_d$ can be determined as the vector difference of $\overline{U}_2$ and $\overline{U}_1$. The vector $\overline{U}_d$ provided by the test weights allows the measurement vector (i.e. the first vector $\overline{U}_1$) to be quantified in terms of mass at the same radius as the test weights' position (equivalent to amplitude) and position (equivalent to phase) relative to the test weights. The necessary amount and location of counterweights to balance the imbalance may also be determined.

For a 3-bladed turbine, the values for $\overline{U}_1$ and $\overline{U}_2$ output from the FFT analyzer 272 allow a counterweight vector ($\overline{U}_c$) required to balance the rotor to be segmented into two (2) vectors, denoted $\overline{u}_1$ and $\overline{u}_2$, which are within the rotor plane 120. For a 3-bladed rotor $\overline{u}_1$ and $\overline{u}_2$ are separated from the reference blade 112 by a 120 degree distance such that the vectors $\overline{u}_1$ and $\overline{u}_2$ are located on two (2) blades of the rotor 110. A set of blades 112 is balanced by taking the blade with the largest mass moment and adjusting the mass moment of the other blades 112 by adding counterweights to those blades 112. As the reference blade to which the test weights are added is randomly chosen, the reference blade may or may not have the largest mass moment. The correction vectors $\overline{u}_1$ and $\overline{u}_2$ represent the necessary counterweights to balance the rotor 110. The amplitude of the vectors $\overline{u}_1$ and $\overline{u}_2$ are equivalent to the masses of the counterweights required at the same radius as the test weights' position on the respective blades 112, and the phase of the vectors represent the location of the counterweights (i.e., on which blades the weights are required). Each counterweight comprises one or more mass/weight elements. That is, the imbalance vector can be eliminated by solving a 2×2 matrix of the vectors $\overline{u}_1$ and $\overline{u}_2$ so that the resulting vector is zero. This analysis results in a determination of the mass moment that is needed to correct mass imbalance of the blades 112. This analysis can be performed by specialized software such as IMC's FAMOS or Labview™ from National Instruments Corporation.

Figure 7:
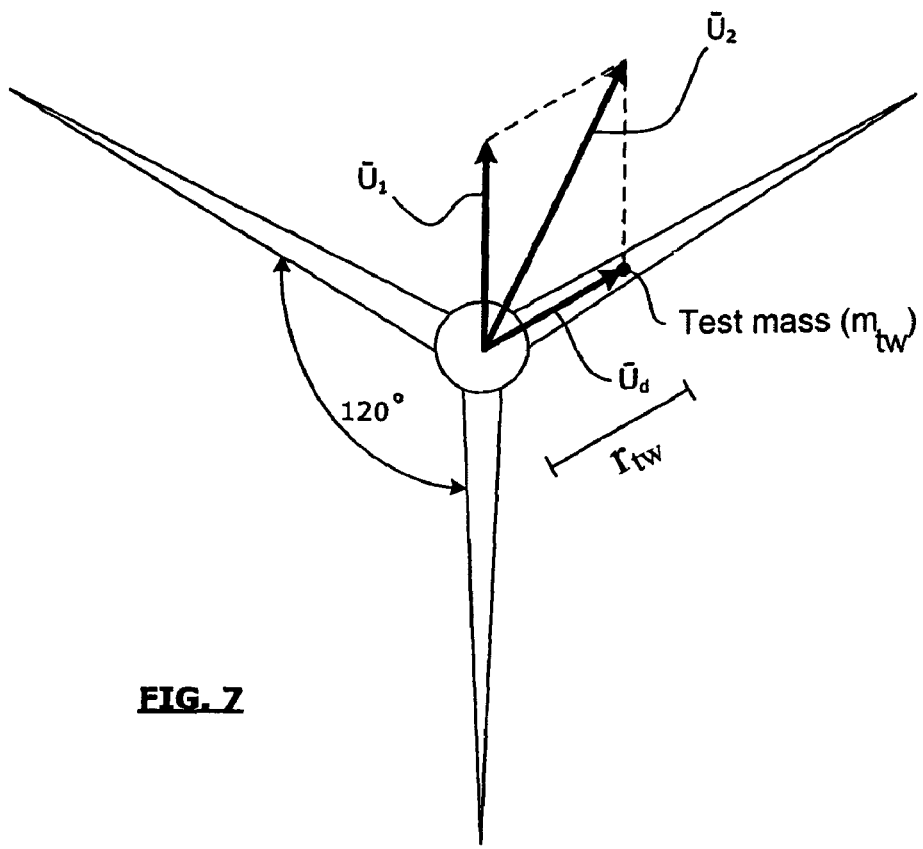
FIG. 7 is a schematic diagram illustrating vectors involved in determining the mass imbalance of a wind turbine rotor in accordance with one embodiment of the present disclosure.

Referring now to FIG. 7, an example method of calculating the counterweights required to correct a mass imbalance in accordance with one embodiment of the present disclosure will now be described. FIG. 7 illustrates three vectors $\overline{U}_1$, $\overline{U}_2$ and $\overline{U}_d$ involved the method of calculating the counterweights. $\overline{U}_1$, $\overline{U}_2$ and $\overline{U}_d$ vectors each have an amplitude corresponding to the vibration in the lateral direction of the rotor 110, and a phase relative to a polar coordinate system which has its origin at the center of the rotation (i.e., a centre of the rotor 110). Given that each of these vectors has an amplitude and phase, $\overline{U}_1$, $\overline{U}_2$ and $\overline{U}_d$ can each be represented as complex numbers with real and imaginary components corresponding to amplitude (magnitude of vibration) and phase.

As noted above, $\overline{U}_1$ is the imbalance vector obtained from readings of the lateral accelerometer 222. $\overline{U}_2$ is the second vector obtained from readings of the lateral accelerometer 222 using test weights and represents the combination of the imbalance vector ($\overline{U}_1$) and the mass influence due to test weights ($\overline{U}_d$). $\overline{U}_d$ represents the motion (vibration) due to the test weights located on the reference blade 112 and cannot be measured directly. dU is calculated as the difference between $\overline{U}_2$ and $\overline{U}_1$ ($\overline{U}_d = \overline{U}_2 - \overline{U}_1$). In mathematical terms:

$\overline{U}_2$=lateral mass imbalance+influence of test weights imbalance, or $$\overline{U}_2 = \overline{U}_1 + \overline{U}_d \quad (1)$$

$$\overline{U}_d = \overline{U}_2 - \overline{U}_1 \quad (2)$$

The magnitude of the counterbalance required to correct the mass imbalance is presented by the counterweight vector $\overline{U}_c$ described below in equation (3). It will be appreciated that, if the value of the counterweight vector $\overline{U}_c$ is zero, no counterweight is required and the rotor 110 is already balanced. The amplitude ($U_c$) of the counterweight vector ($\overline{U}_c$) is a multiplier which represents the required mass moment to correct the mass imbalance, but is not vectorized to blade coordinates. As described more fully below, U can be transformed into the correction vectors $\overline{u}_1$ and $\overline{u}_2$ in blade coordinates which identify the location of the required counterweight(s) for one or more of the blades 112. In at least some embodiments, the location of counterweight(s) is an angle from the reference blade (from example, in degrees). If the value of one of the correction vectors $\overline{u}_1$ and $\overline{u}_2$ is zero, counterweights are required on only one blade 112. If the value of both correction vectors $\overline{u}_1$ and $\overline{u}_2$ is non-zero, counterweights are required on two blades.

$$\overline{U}_c = -\overline{U}_1/\overline{U}_d \quad (3)$$

$\overline{U}_c$ may be represented by a complex number like $\overline{U}_1$ and $\overline{U}_d$ by which it is defined ($\overline{U}_c = U_{c,real} + U_{c,imag} * i = a + bi$, where $i = (-1)^{0.5}$). The amplitude ($U_c$) and phase ($\theta$) of the counterweight vector ($\overline{U}_c$) can be represented by a point in an "x, y" coordinate plane, with an x-coordinate "a" and a y-coordinate "b". Using the Euclidean definition of distance for which the Pythagorean theorem holds, $U_c$ can be related to a and b as follows:

$$U_c^2 = a^2 + b^2, or \quad (4)$$

$$U_c = \sqrt{a^2 + b^2} \quad (5)$$

Using the standard trigonometric definitions of sines and cosines, the sine of an angle (the phase of $U_c$) is defined to be the ratio of y-coordinate b to length $U_c$, and the cosine is the ratio of x-coordinate a to $U_c$, which gives:

$$a = U_{c,real} = U_c \times \cos(\theta) \quad (6)$$

$$b = U_{c,imag} = U_c \times \sin(\theta) \quad (7)$$

$U_c$ in equations (6) and (7) is the absolute value of $U_c$.

The counterweight vector $U_c$ can be translated into blade coordinates defined by a first correction vector $\overline{u}_1$ and a second correction vector $\overline{u}_2$. The first correction vector $\overline{u}_1$ has an amplitude $\overline{u}_1$ which represents the mass moment of a counterweight and a phase $\phi 1$ which represents the blade 112 on which the counterweight is to be located. The second correction vector $\overline{u}_2$ has an amplitude $\overline{u}_2$ which represents the mass moment of a counterweight and a phase $\phi 2$ which represents the blade 112 on which the counterweight is to be located. The phase $\phi 1$ and $\phi 2$ of the first and second correction vectors are selected from the following table using the phase $\theta$ of the counterweight vector $\overline{U}_c$:

| $\Theta$ | $\phi 1$ | Location of $u_1$ | $\phi 2$ | Location of $u_2$ |
|---|---|---|---|---|
| $0° \leq \theta < 120°$ | 0° | same blade as the reference blade with test weights | 120° | the blade following the reference blade with test weights (in direction of rotor rotation) |
| $120° \leq \theta < 240°$ | 120° | the blade following the reference blade with test weights (in direction of rotor rotation) | 240° | the blade ahead of the reference blade with test weights (in direction of rotor rotation) |
| $240° \leq \theta < 360°$ | 0° | same blade as the reference blade with test weights | 240° | the blade ahead of the blade with the reference blade with test weights (in direction of rotor rotation) |

It will be appreciated that projection of $\bar{u}_1$ and $\bar{u}_2$ into blade coordinates is relative to the reference blade having the test weights and depends on the phase (θ) of the counterweight vector $\bar{U}_c$. Thus, the phase φ1 and φ2 represent the location of the counterweight(s) on the blades 112 in terms of an angle relative to the reference blade 112. The amplitude ($u_1$ and $u_2$) of the first correction vector $\bar{u}_1$ and a second correction vector $\bar{u}_2$ are calculated in accordance with the following equations:

$$u_1 = (s_2 \times U_{c,\,real} - c_2 \times U_{c,\,imag}) \times det \quad (8)$$

$$u_2 = (-s_1 \times U_{c,\,real} + c_1 \times U_{c,\,imag}) \times det \quad (9)$$

where $$c_1 = \cos(\phi 1) \quad (10)$$

$$c_2 = \cos(\phi 2) \quad (11)$$

$$s_1 = \sin(\phi 1) \quad (12)$$

$$s_2 = \sin(\phi 2) \quad (13)$$

$$det = m_{tw}/(c_1 \times s_2 - s_1 \times c_2) \quad (14)$$

Using the values of $\bar{U}_2$ and $\bar{U}_1$ output by the FFT analyzer 272, $\bar{U}_d$ can be calculated using equation (2). $\bar{U}_c$ can then be calculated using equation (3), $\bar{U}_1$ and $\bar{U}_d$. The phase (θ) of $\bar{U}_c$ can then be used to select the values of φ1 and φ2 from the table provided above.

Using φ1, φ2, and $c_1$, $c_2$, $s_1$, and $s_2$ can be calculated using equations (10) to (13). Using the predetermined mass ($m_{tw}$) of the test weights added to the reference blade 112 and the calculated values of $c_1$, $c_2$, $s_1$, and $S_2$, the value of a determinant ("det") can be calculated using equation (14). Finally, the correction vectors $\bar{u}_1$ and $\bar{u}_2$ can be calculated using equations (8) and (9) and the calculated values of $c_1$, $c_2$, $s_1$, and $s_2$, det and $U_{c,\,real}$ and $U_{c,\,imag}$. The location of $\bar{u}_1$ and $\bar{u}_2$ in terms of the blade position is set forth above in the table provided above and is based on the phase (θ) of $\bar{U}_c$. The location of the counterweights on the respective blades 112 is the same as the position of the test weights on the reference blade 112 (i.e., the counterweights should be located at the same distance from the blade root as the test weights on the reference blade). It will be appreciated that the amplitudes $\bar{u}_1$ and $\bar{u}_2$ represent directionless mass and that φ1 and φ2 provide directions in blade coordinates of the mass, collectively defining the correction "vectors" $\bar{u}_1$ and $\bar{u}_2$.

It will also be appreciated that the correction vectors $\bar{u}_1$ and $\bar{u}_2$ represent masses of the counterweight relative to the test weight. The values of $u_1$ and φ1 provide the value of the calculated counterweight on a specific blade 112 (the first correction vectors $\bar{u}^1$), whereas $\bar{u}_2$ and φ2 give the value of the calculated counterweight on a second blade 112 (the second correction vectors $\bar{u}_2$). In other words, the values of $u_1$ and $u_2$ represent relative mass in that the calculated counterweights have to be fixed at the same position as the test mass. The relative masses $u_1$ and $u_2$ are calculated as fractions/multipliers of the test mass using the above equation.

While the foregoing description describes a method of calculating the counterweights required to correct a mass imbalance of a 3-bladed turbine, it will be appreciated that the teachings described herein may be applied to 2-bladed turbines and to turbines with more than 3-blades by making the necessary adjustments for the phase (θ) of the counterweight vector $\bar{U}_c$ and the values of φ1 and φ2. The necessary adjustments would be readily understood to a person of ordinary skill in the art.

Figure 5:
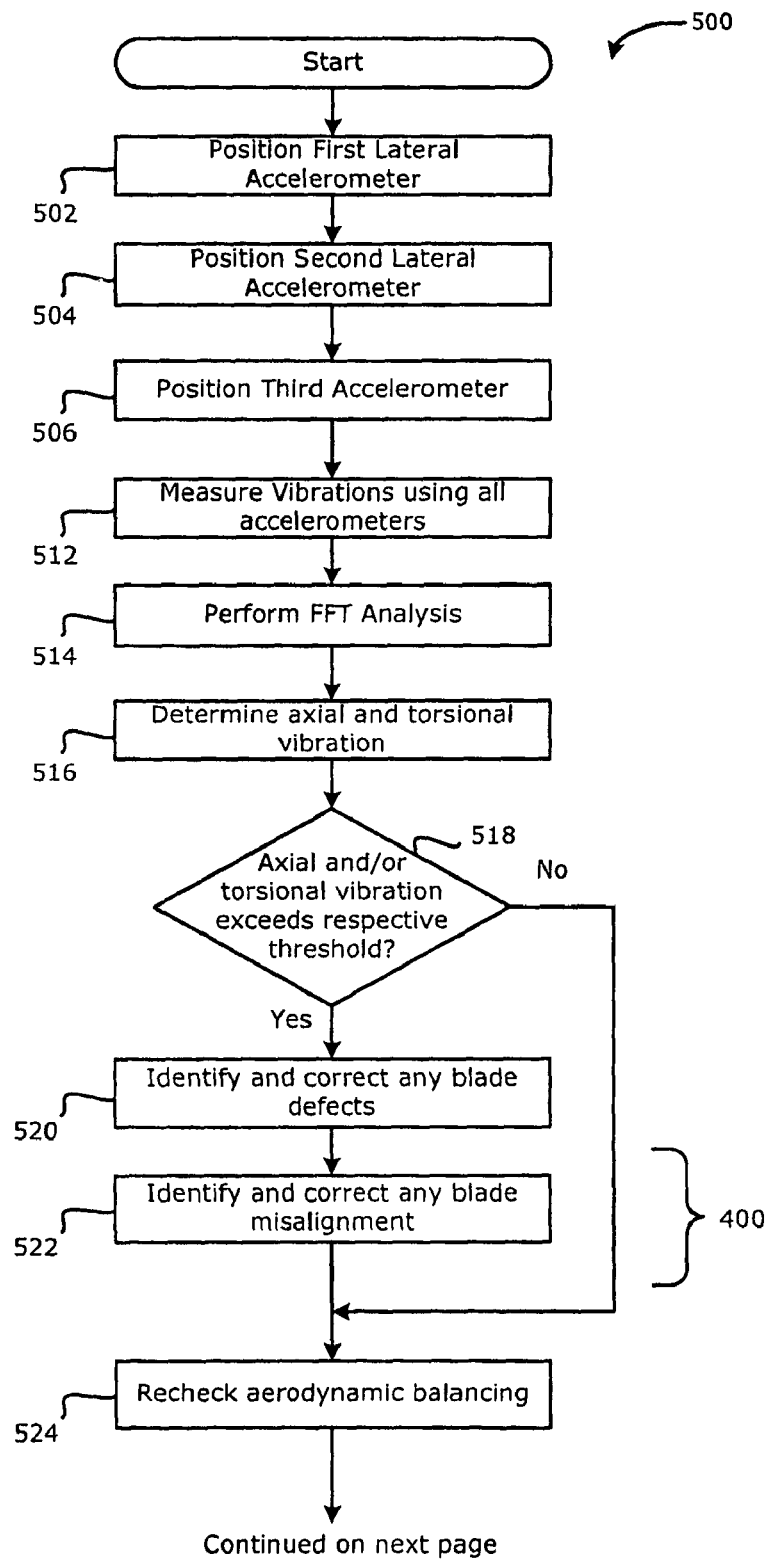
FIG. 5 is a flowchart illustrating example operations for detecting and correcting mass imbalances and aerodynamic imbalances of a wind turbine rotor in accordance with one embodiment of the present disclosure.
Figure 5:
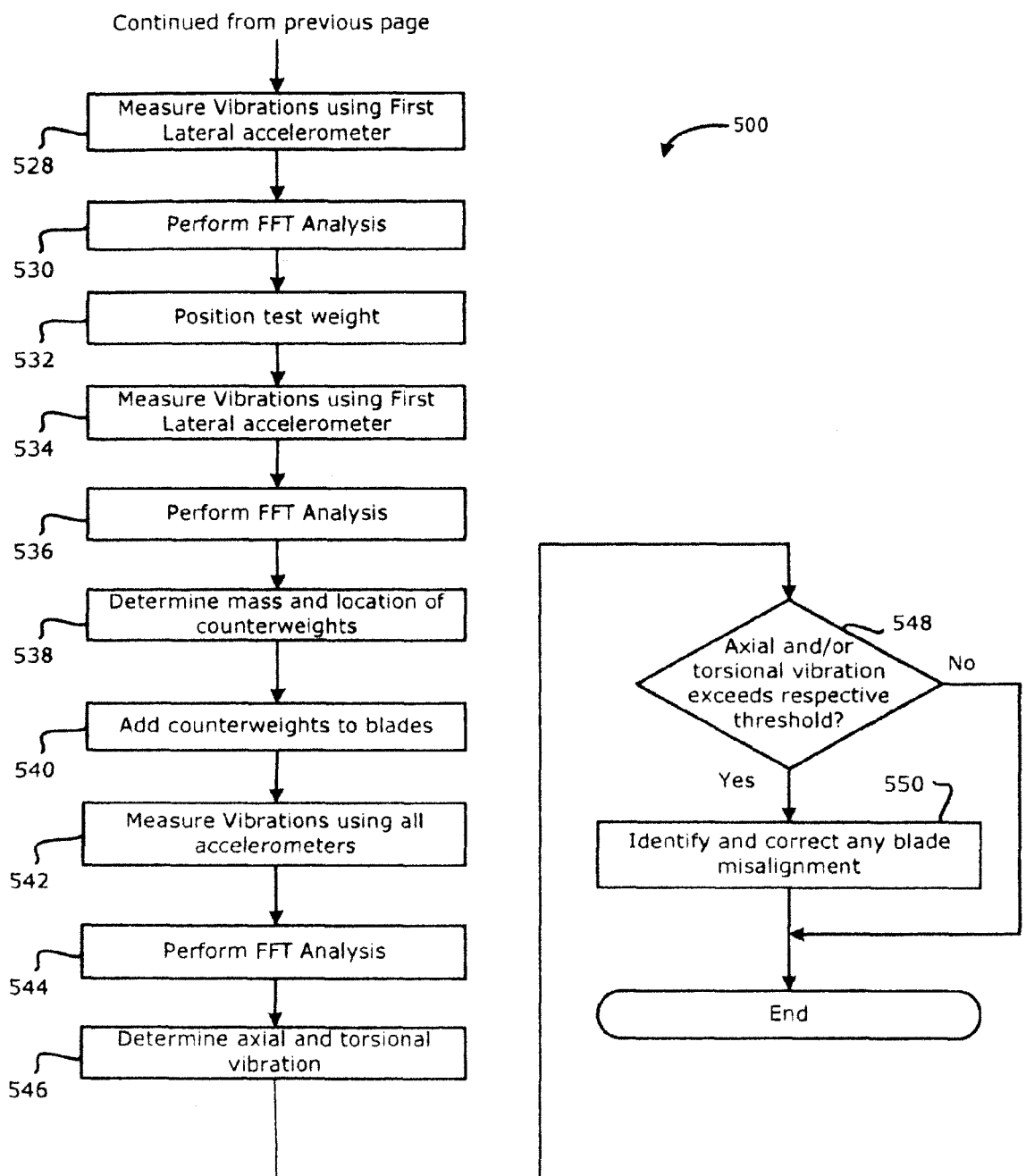

Referring now to FIG. 5, example operations 500 of a method for determining a mass imbalance of a rotor of a wind turbine using the vibration measurement system 240 and correcting any mass imbalance in accordance with one embodiment of the present disclosure will be described. The method may be used to detect vibration resulting from aerodynamic and/or mass imbalances. The operations 500 are usually performed after aerodynamic balancing of the rotor 110 has been performed to correct misalignment of the blades 112 of the rotor 110. This is because a mass imbalance may counteract (counterbalance) an aerodynamic imbalance. Thus, better results may be achieved after aerodynamic balancing of the rotor 110 so that aerodynamic imbalances do not counteract any mass imbalance of the rotor 110. However, aerodynamic balancing could be performed without mass balancing. This may result in a less accurate mass balancing. However, when aerodynamic balancing was recently performed, the effects on mass balancing may be negligible or non-existent by not performing aerodynamic balancing before mass balancing. The operations 500 are performed while the wind turbine 100 is operating, that is while the wind drives the rotor blades 112 about the rotor axis 118.

First, in step 502 a first accelerometer 222 is positioned on the metal frame of the tower 102 inside the housing of the nacelle 106 at a distance 206 from the rear end 202 of the nacelle 106 that is generally the same as the distance 204 between the rear end 106 and the central axis 116. The first accelerometer 222 may be positioned so that the sensitive axis 208 of the first accelerometer 222 is parallel to the rotor plane 120. With this orientation, the first accelerometer 222 primarily measures the vibrations in the lateral direction.

At step 504, a second accelerometer 224 is positioned on the metal frame of the tower 102 inside the housing of the nacelle 106 offset from the first accelerometer 222. The second accelerometer 224 is arranged so that the sensitive axis 214 of the second accelerometer 224 is generally parallel to the sensitive axis 208 of the first accelerometer 222 and the rotor plane 120. The torsional effect of the vibrations of the wind turbine 100 can be determined as the difference between the measurements from the second accelerometer 224 and the measurements from the first accelerometer 222. In some embodiments, the second accelerometer 224 is positioned at or near the rear end 202 of the nacelle 106.

Next, in step 506 the third accelerometer 226 is positioned on the metal frame of the tower 102 inside the housing of the nacelle 106 so that the sensitive axis 212 of the third accelerometer is parallel to alignment the rotor axis 118. In this orientation, the third accelerometer 226 primarily measures the vibrations in the axial direction along the rotor axis 118.

Next, in step 512 a baseline data set of vibration data is measured using each of the accelerometers 222, 224, 226 during a baseline sampling period.

Next, in step 514 a FFT analysis is performed on the baseline data set produced by the accelerometers 222, 224, 226 during the baseline sampling period. The FFT analysis may be an ordered FFT analysis in some embodiments.

Next, in step 516 the axial vibration and torsional vibration are determined from the baseline data set of vibration data is measured using each of the accelerometers 222, 224, 226 during the baseline sampling period. As described above, the axial vibration of the wind turbine 100 is determined from the FFT data of the measurements of the third (axial) accelerometer 226 during the baseline sampling period. The torsional vibration of the wind turbine 100 is determined as the difference between the FFT transformed measurements of the first and second accelerometers 222, 224 (i.e., the lateral central accelerometer 222 and lateral peripheral accelerometer 224)

determined from the FFT data of the measurements taken during the baseline sampling period. To calculate the difference between the first accelerometer 222 and the second accelerometer 224, the vibration measurements from each accelerometer 222 and 224 may be recorded using a data logger 270. The data may then be evaluated using a data analysis and evaluation tool such as IMC's FAMOS™ software tool or Labview™ from National Instruments Corporation; however a hardware implementation or other suitable software running on a computer or other device could be used to calculate the difference between the measurements from the first accelerometer 222 and the second accelerometer 224.

In other embodiments, a specialized torsional sensor 228 may be used to determine the torsional vibration of the wind turbine 100. The specialized torsional sensor 228 measures the torsional vibration of the wind turbine 100 without the need for comparison with the vibration measurements obtained by the first accelerometer 222. In embodiments where a specialized torsional sensor 228 is used, the operations 500 comprises steps of positioning the specialized torsional sensor 228 on the wind turbine 100 and measuring vibration using the specialized torsional sensor 228. The specialized torsional sensor 228 may be placed on the nacelle 106 of the wind turbine 100.

Next, in step 518 it is determined whether the axial vibration and/or torsional vibration are greater than a respective predetermined threshold.

The torsional vibration of the wind turbine 100 is determined as the difference between the lateral central accelerometer 222 and the lateral peripheral accelerometer 224, or directly from the torsional sensor 228. The measurements of the torsional vibration of the wind turbine 100 may be compared against prior measurements from the same or a similar turbine to determine if it is greater than or equal to a predetermined threshold for torsional vibration. Each type or class of turbine has its own predetermined threshold for torsional vibration. A tolerable influence from torsional vibration for most turbines is 0.00025 $1/s^2$ which equates to a difference of 0.1 mg or 0.0001 "g" of the readings of the between the lateral central accelerometer 222 and lateral peripheral accelerometer 224. It is assumed that during the axial vibration measurements the wind speed remains relatively constant without any substantial gusts. High winds and gusts can be compensated for by adjusting the yaw offset (the deviation between wind direction and nacelle direction) as necessary to minimize or eliminate the adverse affects from high winds and gusts.

If the amount of torsional vibration is greater than or equal to predetermined threshold for torsional vibration, the respective measurement signal is too high and therefore the turbine is out of tolerance. If the torsional vibration is greater than the predetermined threshold, this indicates the existence of a blade misalignment, blade defects, or both. Examples of blades defects include leading edge erosion and twist defects. If the amount of torsional vibration is less than the predetermined threshold of torsional vibration, then the turbine 100 has a tolerable or "low influence" from torsional vibration.

The axial vibration of the wind turbine 100 is determined from the measurements of the axial accelerometer 226, usually after FFT analysis. The measurements of the axial vibration of the wind turbine 100 may be compared against prior measurements from the same or a similar turbine to determine if it is greater than or equal to a predetermined threshold for axial vibration. Each type or class of turbine has its own predetermined threshold for axial vibration. A tolerable influence from axial vibration for most turbines is 1.0 to 10.0 mg of the axial accelerometer 226.

If the amount of axial vibration is greater than or equal to predetermined threshold for axial vibration, the respective measurement signal is too high and therefore the turbine is out of tolerance. If the axial vibration is greater than the predetermined threshold, this indicates the existence of a blade misalignment, blade defects, or both. Examples of blades defects include leading edge erosion and twist defects. If the amount of axial vibration is less than the predetermined threshold of axial vibration, then the turbine 100 has a tolerable or "low influence" from axial vibration.

In most embodiments, both the torsional vibration and axial vibration are determined and analyzed to determine whether to inspect/analyse the blades 112 for blade defects and/or blade misalignment. In some embodiments, the blades 112 are checked for blade defects and/or blade misalignment only when both torsional vibration and axial vibration exceed their respective predetermined thresholds. In other embodiments, only one of torsional vibration and axial vibration needs to exceed their respective predetermined thresholds before checking for blade defects and/or blade misalignment. Depending on the embodiment, a particular one of the axial vibration and torsional vibration, or either of the axial vibration and torsional vibration, is greater than the respective predetermined threshold.

Next, in step 520 when torsional vibration is greater than a predetermined threshold and axial vibration is greater than a predetermined threshold, an optical inspection is performed to determine whether one or more blade defects exists, and any blade defects which are identified are corrected. The blade defects which may exist include, but are not limited to, twist failures, cone angle errors, division angle errors, leading edge erosion, and missing vortex generators and/or stall strips. Depending on the nature and magnitude of a detected blade defect, replacement of a blade 112 may be required.

Next, in step 522 an analysis is performed to determine whether the blades 112 of the rotor 110 are aligned with each other (e.g., whether a blade misalignment exists). When the blades 112 of the rotor 110 are not aligned with each other, the blades 112 of the rotor 110 are aligned with respect to each other so that the blades are within a predetermined tolerance of the predetermined blade angle. Step 522 is performed in accordance with the operations 400 shown in FIG. 4 and described more fully above.

Next, in step 524 aerodynamic balancing may be checked following any blade defect repair and/or blade replacement in step 520 and/or any blade (re)alignment in step 522. When torsional vibration is greater than a predetermined threshold and axial vibration is greater than a predetermined threshold, blade (re)alignment in step 522 may be repeated. Step 524 is optional and, when performed, provides a double-check for aerodynamic balancing to ensure that the blades 112 are aligned.

In other embodiments, steps 520 and 522 may be performed regardless of the torsional vibration or axial vibration. In such embodiments, steps 512 to 518 may be omitted, or steps 516 to 518 may be omitted while performing steps 512 to 514 to obtain the baseline data prior to any blade defect correction or aerodynamic balancing.

At this stage in the operations 500, aerodynamic balancing has been performed and mass balancing may be performed next.

Next, in step 528 a first data set of vibration data is measured using at least the first (lateral) accelerometer 222, and possibly the accelerometers 224, 226, over a first sampling period. The second and third accelerometers 224, 226 need not measure vibrations during the first sampling period because the data is not required for mass imbalance calculations or the calculation of the required counterweights. However, the data may still be useful in analyzing the overall imbalances which are detected and corrected at the various stages of the operations 500.

Next, in step 530 a Fast Fourier Transformation (FFT) analysis is performed on the first data set produced by the first accelerometer 222 over the first sampling period, possibly from all of the accelerometers 222, 224, 226. In some embodiments, an ordered FFT analysis may be performed. In these embodiments, operations 500 comprises placing a rotation speed sensor 230 on or in the wind turbine 100 (if one is not already present) and measuring the rotation speed using the rotation speed sensor 230. An ordered fast Fourier transformation analysis may be performed using the rotation speed and the measurements from at least one of the accelerometers 222, 224, 226. In some embodiments, the rotation speed sensor 230 is an optical sensor and the operations 500 comprise a step of placing the reflector 232 on the rotor shaft 210. In other embodiments, where the rotation speed sensor 230 is also an optical sensor, the operations 500 comprise a step of placing the reflector 232 on a rotor blade 112. In other embodiments, the rotation speed sensor 230 may be a proximity sensor which is placed opposite the rotor 110 to detect when a blade 112 passes by (i.e., when it is in proximity to the proximity sensor).

Next, in step 532 a test weight or test weights having a predetermined mass ($m_{tw}$) is positioned at a radius ($r_{tw}$) from the center of rotation of one of the blades 112 of the rotor 110 designated as a reference blade. As noted above, the test weight(s) may be strapped to the root of the reference blade or placed within a balancing chamber.

Next, in step 534 a second data set of vibration data is measured using at least the first accelerometer 222, and possibly the accelerometers 224, 226, with the test weight positioned on the reference blade over a second sampling period. The second and third accelerometers 224, 226 need not measure vibrations during the second sampling period because the data is not required for mass imbalance calculations or the calculation of the required counterweights. However, the data may still be useful in analyzing the overall imbalances which are detected and corrected at the various stages of the operations 500. After the second data set of vibration data is measured, the test weight may be removed from the reference blade.

Next, in step 536 a FFT analysis is performed on the second data set produced by the first accelerometer 222 during the second sampling period, possibly from all of the accelerometers 222, 224, 226. The FFT analysis may be an ordered FFT analysis in some embodiments.

Next, in step 538 the mass and location of any counterweights required to balance the mass of the rotor 110 is determined using the vibration data from the first accelerometer 222 during the first and second sampling periods. This data is typically obtained from the FFT analyzer 272. In at least some embodiments, the method described above is used to determine a first correction vector ($\bar{u}_1$) having an amplitude ($u_1$) equal to mass of a first counterweight for one blade 112 and a phase ($\phi 1$) which identifies the location of the first counterweight in terms of an angle relative to the reference blade on which the test weight was added, and to determine a second correction vector ($\bar{u}_2$) having an amplitude ($u_2$) equal to mass of a second counterweight for another blade 112 and a phase ($\phi 2$) which identifies the location of the second counterweight in terms of an angle relative to the reference blade on which the test weight was added.

Next, in step 540 any mass imbalance is corrected by adding the first counterweight having a mass of $u_1$ at a blade indicated by the phase ($\phi 1$) at a radius ($r_{tw}$) from its center of rotation, and adding a second counterweight having a mass of $u_2$ at a blade indicated by the phase ($\phi 2$) at a radius ($r_{tw}$) from its center of rotation.

Next, aerodynamic balancing may be re-checked following the mass balancing in steps 528 to 540. The following steps are optional and, when performed, provides a double-check for aerodynamic balancing to ensure that the blades 112 are aligned. In step, 542 a third data set of vibration data is measured using each of the accelerometers 222, 224, 226 during a third sampling period. Next, in step 544 a FFT analysis is performed on the third data set produced by the accelerometers 222, 224, 226 during the third sampling period. The FFT analysis may be an ordered FFT analysis in some embodiments.

Next, in step 546 the axial vibration and torsional vibration are determined from the third data set of vibration data is measured using each of the accelerometers 222, 224, 226 during the third sampling period. Alternatively, the specialized torsional sensor 228 may be used as described above.

Next, in step 548 it is determined whether the axial vibration and/or torsional vibration are greater than a respective predetermined threshold.

Next, in step 550 when torsional vibration is greater than a predetermined threshold and axial vibration is greater than a predetermined threshold, an analysis is performed to determine whether the blades 112 of the rotor 110 are aligned with each other (e.g., whether a blade misalignment exists). When the blades 112 of the rotor 110 are not aligned with each other, the blades 112 of the rotor 110 are aligned with respect to each other so that the blades are within a predetermined tolerance of the predetermined blade angle. Step 550 is performed in accordance with the operations 400 shown in FIG. 4 and described more fully above.

While the operations 500 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments. For example, the accelerometers 222, 224, 226 may be positioned on the wind turbine 100 in any order provided they are positioned prior to use. Moreover, an ordered FFT analysis is optional and need not be performed in all embodiments such as, for example, when a relatively constant rotation speed of the rotor 110 is maintained. Moreover, one or both of the aerodynamic balancing double-checks of step 524 and steps 542-550 may be performed in different embodiments.

The vibration calculations and determinations described herein are preferably performed by the computer 280 having specialized computer software stored thereon based on input from the FFT analyzer 272, and are preferably performed automatically in response to input from the accelerometers or FFT analyzer 272.

While the foregoing description describes example embodiments in which vibration analysis is perform using accelerometers, it will be appreciated that accelerometers are just one example of a suitable vibration sensor and that different vibration sensors could be used in other embodiments. For example, vibration sensors such as velocity sensors or displacement sensors could be used in other embodiments. Thus, in other embodiments any one or more of the accelerometers 222, 224 and 226 could be substituted for velocity sensors or displacement sensors, or possibly combinations thereof. The construction of velocity sensors and displacement sensors are known in the art and will not be described herein. Any suitable velocity sensor or displacement sensor could be used in place of the accelerometers in the foregoing example embodiments.

It will be appreciated by persons skilled in the art that the teachings of the present disclosure may be applied to a variety of structures having a rotor and rotor blades. As such, while the present disclosure is described and illustrated in the context of wind turbine 100, the innovations of the present disclosure are not intended to be limited to wind turbines. It will be recognized that the innovations of the present disclosure may be utilized in a variety of systems and for a variety of applications.

It will be further appreciated that, for the purpose of explanation, vector references mentioned in the specification have been shown using bar notation (e.g., "") over the respective symbol while the amplitude of such vectors, where mentioned, have been shown using the same symbol without a horizontal bar.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method of determining balancing of a rotor of a wind turbine, the wind turbine comprising a tower and a nacelle mounted to the top of the tower, the rotor being rotatably connected to the nacelle for rotating about a rotor axis and having a plurality of equally spaced blades, the method comprising:
positioning a camera below the rotor;
rotating the rotor so that a first blade is in a reference position in which a tip of the blade is directed toward the camera;
capturing an image of the first blade in the reference position;
rotating the rotor so that a second blade is in the reference position;
capturing an image of the second blade in the reference position;
determining a blade angle of the first blade from the image of the first blade in the reference position, wherein the blade angle is the angle between the rotor plane and a predetermined chord line of the blade designed as a reference point;
determining the blade angle of the second blade from the image of the second blade in the reference position; and
determining whether the blade angle of the first and second blades are within a predetermined threshold.

2. The method of claim 1, further comprising:
adjusting the angle of the first blade so that the blade angle of the first blade is within the predetermined threshold when the blade angle of the first blade is not within the predetermined threshold; and
adjusting the angle of the second blade so that the blade angle of the second blade is within the predetermined threshold when the blade angle of the second blade is not within the predetermined threshold.

3. The method of claim 1, wherein determining the blade angle of the first blade comprises:
determining a chord line at the tip of the first blade from the image of the first blade in the reference position;
determining the rotor plane from the image of the first blade in the reference position; and
determining the blade angle of the first blade as the angle between the chord line and the rotor plane; and
wherein determining the blade angle of the second blade comprises:
determining a chord line at the tip of the second blade from the image of the second blade in the reference position;
determining the rotor plane from the image of the second blade in the reference position; and determining the blade angle of the second blade as the angle between the chord line and the rotor plane.

4. The method of 3, wherein the chord line used in determining the blade angle is the maximum chord line.

5. The method of claim 1, further comprising
rotating the rotor so that a third blade is in the reference position;
capturing an image of the third blade in the reference position;
determining the blade angle of the third blade in the image of the third blade; and
determining whether the blade angle of the third blade is within the predetermined threshold; and
adjusting the angle of the third blade so that the blade angle of the third blade is within the predetermined threshold when the blade angle of the third blade is not within the predetermined threshold.

6. The method of claim 5, further comprising
rotating the rotor so that a fourth blade is in the reference position;
capturing an image of the fourth blade in the reference position;
determining the blade angle of the fourth blade in the image of the fourth blade; and
determining whether the blade angle of the fourth blade is within the predetermined threshold; and
adjusting the angle of the fourth blade so that the blade angle of this blade is within the predetermined threshold when the blade angle of the fourth blade is not within the predetermined threshold.

7. The method of claim 1, wherein the camera is a digital camera, the capturing of the images comprising saving the images to a memory of the digital camera, the method further comprising transferring the images from the memory of the camera to a memory of a computer, wherein the determining of the blade angle of the blades and determining whether the blade angle of the blades is within the predetermined threshold are performed on the computer.

8. The method of claim 7, wherein the computer comprises an image recognition module which configures a processor of the computer to automatically determine of the blade angle of the blades and automatically determine whether the blade angle of the blades is within the predetermined threshold.

9. The method of claim 2, further comprising:
positioning a first vibration sensor towards the central axis of the tower with its sensitive axis of the first vibration sensor substantially parallel to the rotor plane;

measuring a first data set of vibration data using the first vibration sensor over a first sampling period; and
determining a counterweight for at least one blade in the rotor in accordance with the first data set of vibration data when a mass imbalance in the rotor exists.

10. The method of claim 9, wherein a first reference distance is defined by the rear end of the nacelle and the central axis of the tower, wherein the first vibration sensor is positioned at a distance from the central axis of the tower substantially the same as the first reference distance.

11. The method of claim 10, further comprising:
positioning a test weight having a predetermined mass ($m_{tw}$) on one of the blades of the rotor designated as a reference blade at a radius ($r_{tw}$) from the center of rotation of the blade; and
measuring a second data set of vibration using the first vibration sensor with the test weight positioned on the reference blade over a second sampling period;
wherein determining a counterweight comprises:
determining a first imbalance vector ($\overline{U}_1$) from the first data set of vibration data, the imbalance vector having an amplitude and a phase;
determining a second imbalance vector ($\overline{U}_2$) from the second data set of vibration data, the imbalance vector having an amplitude and a phase; and
determining a mass of the test weight to be located on the at least one blade at the radius ($r_{tw}$) from its center of rotation and the particular one of the blades in accordance with the first imbalance vector ($\overline{U}_1$) and second imbalance vector ($\overline{U}_2$).

12. The method of claim 11, further comprising: adding the counterweight to the at least one blade in the rotor at the radius ($r_{tw}$) from its center of rotation.

13. The method of claim 11, wherein the rotor comprises three blades equally spaced apart, and wherein determining at least one correction vector comprises:
determining a third imbalance vector ($\overline{U}_d$) in accordance with the equation $\overline{U}_d = \overline{U}_2 - \overline{U}_1$;

determining a counterweight vector in accordance with the equation $\overline{U}_c = -\overline{U}_1 / \overline{U}_d$, wherein $\overline{U}_c$ has an amplitude ($U_c$) and a phase ($\theta$) and $\overline{U}_c$ is a complex number where $\overline{U}_c = U_{c,\ real} + U_{c,\ imag} * i$, wherein $i = (-1)^{0.5}$, $U_{c,\ real} = U_c \times \cos(\theta)$, $U_{c,\ imag} = U_c \times \sin(\theta)$; and determining a first correction vector ($\overline{u}_1$) having an amplitude ($u_1$) and a phase ($\phi 1$) and a second correction vector ($\overline{u}_2$) having an amplitude ($u_2$) and a phase ($\phi 2$), wherein $\phi 1$ and $\phi 2$ are selected from the following table using the phase $\theta$ of the counterweight vector $\overline{U}_c$:

| Θ | φ1 | Location of $\overline{u}_1$ | Φ2 | Location of $\overline{u}_2$ |
|---|---|---|---|---|
| 0° ≦ θ < 120° | 0° | same blade as the reference blade with test weights | 120° | the blade following the reference blade with test weights (in direction of rotor rotation) |
| 120° ≦ θ < 240° | 120° | the blade following the reference blade | 240° | the blade ahead of the reference blade with test |
| 240° ≦ θ < 360° | 0° | same blade as the reference blade with test weights | 240° | the blade ahead of the blade with the reference blade with test weights (in direction of rotor rotation) | wherein the amplitude $u_1$ of the first correction vector ($\overline{u}_1$) and the amplitude $u_2$ of the second correction vector ($\overline{u}_2$) are determined in accordance with the equations $u_1 = (s_2 \times U_{c,\ real} - c_2 \times U_{c,\ imag}) \times \det$, $u_2 = (-s_1 \times U_{c,\ real} + c_1 \times U_{c,\ imag}) \times \det$, wherein, $c_1 = \cos(\phi 1)$, $c_2 = \cos(\phi 2)$, $s_1 = \sin(\phi 1)$, $s_2 = \sin(\phi 2)$, and $\det = m_{tw} / (c_1 \times s_2 - s_1 \times c_2)$.

14. The method of claim 13, further comprising: adding a first counterweight having a mass of $u_1$ at a blade indicated by the phase ($\phi 1$) at a radius ($r_{tw}$) from its center of rotation, and adding a second counterweight having a mass of $u_2$ at a blade indicated by the phase ($\phi 2$) at a radius ($r_{tw}$) its center of rotation.

15. The method of claim 11, wherein the amplitude and phase of the first imbalance vector ($\overline{U}_1$), and the amplitude and phase of the second imbalance vector ($\overline{U}_2$) are determined by performing a Fast Fourier Transformation (FFT) on the first data set of vibration data and second data set of vibration data, respectively.

16. The method of claim 15, further comprising:
measuring a rotation speed of the rotor during the first and second sampling periods; and
determining an average rotation speed of the rotor during each of the first and second sampling periods respectively; and
prior to determining the amplitude and phase of the first imbalance vector ($\overline{U}_1$) and second imbalance vector ($\overline{U}_2$), re-sampling the first and second data sets in accordance with the average rotation speed during each of the first and second sample periods using linear approximation to obtain a constant number of samples per revolution.

17. The method of claim 16, further comprising:
positioning a rotation speed sensor on the wind turbine, wherein the rotation speed of the rotor is determined using the rotation speed sensor.

18. The method of claim 1, further comprising:
positioning a second vibration sensor towards the rear end of the nacelle offset from the first vibration sensor with its sensitive axis of the second vibration sensor substantially parallel to the sensitive axis of the first vibration sensor;
measuring a third data set of vibration using the second vibration sensor during a third sampling period;
determining torsional vibration of the rotor as the difference between the first and third data sets;

determining if the torsional vibration is greater than a predetermined threshold; and when the torsional vibration is greater than a predetermined threshold, determining whether the blades of the rotor are aligned with each other and/or whether one or more blade defects exists.

19. The method of claim 1, further comprising:

positioning a torsional sensor on the nacelle;

measuring a third data set comprising torsional vibration data using the torsional sensor during a third sampling period;

determining if the torsional vibration is greater than a predetermined threshold; and when the torsional vibration is greater than a predetermined threshold, determining whether the blades of the rotor are aligned with each other and/or whether one or more blade defects exists.

20. The method of claim 1, further comprising:

positioning a third vibration sensor with its sensitive axis substantially perpendicular to the rotor plane; and measuring a fourth data set of vibration using the third vibration sensor;

determining axial vibration of the rotor in accordance with the fourth data set; and determining if the axial vibration is greater than a predetermined threshold; and when the axial vibration is greater than a predetermined threshold, determining whether the blades of the rotor are aligned with each other and/or whether one or more blade defects exists.

21. The method of claim 18, further comprising:

when the blades of the rotor are not aligned with each other, aligning the blades of the rotor with respect to each other so that the blades are within a predetermined tolerance of predetermined blade angle; and when a blade defect exists, correcting the blade defect.

22. The method of claim 1, further comprising:

prior to capturing an image of the first blade in the reference position, rotating the blades of the rotor to working position in which the angle between the rotor plane and a predetermined chord line of the blade designed is substantially 0°.

23. The method of claim 1, further comprising:

prior to capturing an image of the first blade in the reference position, rotating the blades of the rotor to a parked position in which the angle between the rotor plane and a predetermined chord line of the blade designed is substantially 90°.

24. A method for determining an imbalance of a rotor of a wind turbine, the wind turbine comprising a tower and a nacelle mounted to the top of the tower, the tower having a central axis extending through the nacelle, the nacelle having a front end and a rear end, the rotor being rotatably connected to the nacelle at the front end for rotating about a rotor axis and having a plurality of rotor blades, the rotation of the rotor about the rotor axis defining a rotor plane, the method comprising:

positioning a first vibration sensor towards the central axis of the tower with its sensitive axis of the first vibration sensor substantially parallel to the rotor plane; and measuring a first data set of vibration data using the first vibration sensor over a first sampling period; and determining a counterweight for at least one blade in the rotor in accordance with the first data set of vibration data when a mass imbalance in the rotor exists.

* * * * *